United States Patent [19]

Wakabashi et al.

[11] Patent Number: 4,954,905
[45] Date of Patent: Sep. 4, 1990

[54] DATA TRANSDUCER POSITION CONTROL SYSTEM FOR DISK STORAGE DRIVE SYSTEM

[75] Inventors: Noriaki Wakabashi, Hirakata; Shuichi Yoshida, Osaka; Toshio Inaji, Minou; Hiromi Onodera, Nara; Tsukasa Yoshiura, Katano; Hiroshi Mitani, Daito, all of Japan

[73] Assignee: Matsushita Electric Industrial Co., Ltd., Osaka, Japan

[21] Appl. No.: 290,187

[22] Filed: Dec. 27, 1988

[30] Foreign Application Priority Data

Dec. 24, 1987 [JP] Japan .................................. 62-328535
Mar. 29, 1988 [JP] Japan .................................. 63-75460

[51] Int. Cl.$^5$ .............................................. G11B 5/596
[52] U.S. Cl. .............................. 360/77.03; 360/78.06; 360/78.09; 360/78.11
[58] Field of Search ............... 360/77.03, 77.04, 78.06, 360/78.09, 78.11

[56] References Cited

U.S. PATENT DOCUMENTS

| | | |
|---|---|---|
| 3,593,333 | 4/1971 | Oswald . |
| 4,135,217 | 1/1979 | Jacques et al. . |
| 4,237,502 | 12/1980 | Erickson, Jr. et al. .......... 360/78.06 |
| 4,396,959 | 8/1983 | Harrison et al. ................. 360/77.03 |
| 4,488,189 | 12/1984 | Axmear et al. .................. 360/78.09 |
| 4,516,177 | 5/1985 | Moon et al. ...................... 360/77.03 |
| 4,568,988 | 2/1986 | McGinlay et al. . |
| 4,616,276 | 10/1986 | Workman . |
| 4,691,152 | 9/1987 | Eli et al. ............................ 360/78.06 |

Primary Examiner—Vincent P. Canney
Assistant Examiner—David L. Robertson
Attorney, Agent, or Firm—Wenderoth, Lind & Ponack

[57] ABSTRACT

A data transducer position control system for data disk storage drive system involves an electronically and mechanically improved method and apparatus for position control of the data transducer adapted to write and/or read information data in and/or from the data tracks provided on a data disk. Particularly, the system comprises a positioning device for actuating the data transducer, a position encoder for detecting the position of the data transducer, a tracking error detector for detecting the relative position of the data transducer to the selected data track, and compensating position calculator for precise tracking so that the speed-up of track access can be effected, that the accuracy in positioning can be improved, that the system itself can be compact in size and reduced in energy consumption, and that the control electronic system can also be simple in arrangement.

53 Claims, 12 Drawing Sheets

BASIC FREQUENCY fo

DATA TRANSDUCER POSITION CONTROL SYSTEM FOR DISK STORAGE DRIVE SYSTEM

BACKGROUND OF THE INVENTION

1. Field of the Invention

The present invention relates to a control system for positioning of a data transducer on data tracks in a disk storage drive system and more specifically, a data transducer position control system for disk storage drive system involving a method and system of moving a data transducer at a high speed to the selected data track and also, controlling the relative position of the data transducer to the data track.

2. Description of the Prior Art

As there has been improved an information recording and reproducing apparatus, a position control system which is much smaller in size, consumes less power, and operates at a higher speed and with more accuracy, has been required for use as a positioning driving system for either a recording or reproducing transducer in a magnetic disk storage drive system or an optical disk storage drive system. Particularly, it is desired: speeding-up for achieving the high speed access corresponding to high speed operation in semiconductors; miniaturization for having a greater amount of capacity in a given size; low power consumption for allowing the system to become compact in size and portable; and high accuracy for increasing the density of tracks and thus, the capacity of memory.

Such a position control system commonly employs a stepping motor as a positioning device. For example, a Hybrid Permanent Magnet type stepping motor is most preferable in which a rotor comprises an axially magnetized permanent magnet and a couple of magnetic materials mounted on both sides of the permanent magnet and having arrays of magnetic teeth formed at equal pitches in the circumferential peripheries of the magnetic materials. Also, a stator in the motor comprises a magnetic material core having groups of magnetic teeth provided therein opposite to the rotor and a plurality of windings mounted on and around the magnetic material core.

The Hybrid Permanent Magnet type stepping motor is energized through a basic power amplifier circuit which includes bridge circuits having a plurality of switches and the windings located between the bridge circuits. When the windings are magnetized one after the other in order by activating the switches at regular intervals of time, the rotor advances from position to position continuously due to the series of magnetizing actions on the windings. The switches are commonly semiconductors.

More specificaly, a 2-phase feeding stepping motor is widely provided which allows its rotor to rotate (advance) ¼ of the tooth-pitch (an electrical angle of 90 degrees) as the switches operate for opening and closing consecutively on synchronizing with exterior signals.

There has been introduced a prior art position control system of a disk system, as disclosed in U.S. Pat. No. 4,568,988, employing such a stepping motor and called as an open loop positioning system in which the bridge circuits are activated one after the other by the input of step pulses and thus, the rotor in the stepping motor advances forward in rotation to move a data transducer for accesss to tracks.

This prior art position control system includes the stepping motor as an electromagnetic positioning device in the open loop positioning system, thus allowing its electronic control circuit to be relatively simple in arrangement. Particularly, as the positioning is made by pulse feeding, a simple method is used in which pulses are directly supplied from a microprocessor to a power amplifier. Additionally, this system offers the higher effectiveness of power as compared to the other positioning device such as a voice coil motor or a servo motor (i.e. an actuator such as a stepping motor having tooth-shaped magnetic teeth in the magnetic circuit can provide high effectiveness of power and generate a great force or torque at a low rate of current), thus being compact in size and less in power consumption.

On the other hand, the system is yet disadvantageous in respect to high-speed operation and accuracy. Particularly, the stepping motor as a positioning device causes a data transducer to vibrate about its standstill point during positioning to the selected data track and thus, it may require a considerable setting time for positioning.

To reduce the vibration and minimize the setting time, the rotor and moving members need to be involved with mechanical viscous damping. This results in intricacy in the arrangement and requires a longer seek time for positioning due to the viscous damping. Such problems may not arise in the position control system incorporated with a voice coil motor or a DC servo motor. As the stepping motor is rotatable at a speed synchronized with outside pulse signals, the data transducer can perform high speed seek when the pulse signals are increased in frequency. However, during high speed operation, unlike low speed operation in which a propelling force is great, the rise-up of current is delayed due to a time constant of windings and hysterisis loss and the production of torque will be reduced in efficiency. Consequently, the stepping motor becomes liable to be out of stepping when the high speed seek is attempted. If the magnetic pole pitch is reduced in width in order to increase the resolution of positioning, the switching frequency increases and the disadvantage will be accelerated.

If the density of tracks is increased by reducing the distance between the two adjacent data tracks for the purpose of increasing the information recording capacity, the positioning needs to have higher accuracy. More particularly, the higher position holding ability (stiffness) against an outside vibration or impact is required and also, the results from track eccentricity or meander will be relatively unnegligible. Particularly in the prior art position control system, the magnetic pole teeth of the rotor and stator in the stepping motor can be increased in number to reduce the degree of step angle for precision in positioning and improvement of the resolution. Howver, in respect to the limitation of mechanical accuracy, the magnetic pole teeth cannot be increased in number. Even if the number is increased and the resolution of positioning is improved, it will still be difficult to obtain the absolute precision of positioning and increase the stiffness (holding torque). Additionally, the prior art position control system fails to provide satisfactory trackability due to the track eccentricity and meander inherent in the replaceable media There has been known another method in which the high speed seek, higher track density and high precision trackability is purposed to improve a data disk storage drive system in performance by using the combination of a closed loop servo control and a position control system having a position device such as a voice coil motor or a DC servo motor. This type of system is however, as compared to the previously described system having the stepping motor, low in power effectiveness, great in power dissipation, unsuitable for miniaturization, and intricate in the arrangement of its electronic control circuit. More specifically, the circuit includes two loops; a position control loop for tracking control and a velocity control loop for seek control. The latter is provided for speed control with a table of velocity profile which is a function of the number of remaining tracks and should be replaced with the former position control loop in electrical control before the data transducer reaches a target track. Also, a velocity measuring circuit is substantially intricate in the arrangement.

Furthermore, according to the prior art data disk storage drive system having the stepping motor actuated by such a known open loop positioning control, the off-tracking of the data transducer cannot be detected at once when resulting from outside vibration or impact. It is considerably important to detect the off-tracking for the reason that the data writing should stop when the data transducer is displaced off the data track due to outside vibration or impact. In the prior art, the disk is provided with servo information embedded in the surface thereof for picking up the relative positioning error of the data transducer to the data track. The servo information is thus utilized for improved trackability and off-track detection.

A latest disk for use in the magnetic data disk storage drive system is provided with no such dedicated servo surface thereof for the purpose of increasing the memory capacity. Instead, the entire disk surface becomes a data recording surface in which pieces of the servo information are scattered. Even on an optical disk of the type with no special track groove, the servo information for tracking is provided in scattering arrangement. This is termed as a sampling servo method or a sector servo method. The sector servo represents the arrangement of servo information in every data sector, particularly as disclosed in U.S. Pat. No. 3,593,333. In such a method, information is given only intermittently due to the servo mechanism and thus, the improvement in trackability will be not easy to accomplish. Also, no off-tracking can be detected instantly upon occuring.

As described above, the prior art position control system for disk storage drive system, employed as a positioning device, using the stepping motor provides the advantage of compactness in arrangement or energy-saving and simultaneously, is disadvantageous in which the track positioning takes a considerable settling time and also, the high-speed seek is effected with difficulty. Additionally, in the respects of a construction of the stepping motor and an arrangement of the open loop positioning control, it is difficult to greatly improve the positioning resolution and increase the accuracy and stiffness in positioning and also, to ensure the trackability throughout the operation. On the other hand, the other known position control system of closed loop servo operation, using another positioning device such as a voice coil motor or a DC servo motor, involves the considerable loss of power and although may allow a data disk storage drive system to be easily improved in performance, is appropriate to no compactification and intricate in the arrangement of its electronic control circuit. As the track pitch in a latest data disk storage drive system is comparatively short, deflection of the data track on a replaceable media during rotation of the disk has to be much considered while affecting in track-ability. Also, the off-tracking is possibly effected due to outside vibration and impact.

SUMMARY OF THE INVENTION

It is an object of the present invention to provide a novel data transducer position control system for disk storage drive system adapted so that the high-speed track access can be effected with accuracy in association with a compact arrangement thereof while low power consumption is achieved.

It is another object of the present invention to provide a data transducer position control system adapted so that the occurrence of out-of-stepping is prevented, that the ability of higher speed seek is increased in effect, and that the propelling force of a positioning device is most effectively generated.

It is a further object of the present invention to provide a data transducer position control system adapted so that the higher speed settling of the data transducer to the selected data track can be made without vibration by regulating a positioning device.

It is a still further object of the present invention to provide a data transducer position control system adapted so that the positioning of the data transducer can be made with high accuracy and at a high degree of resolution with the use of position encoder means and that the high stiffness is provided for suppressing outside vibration and impact.

It is a still further object of the present invention to provide a data transducer position control system adapted so that the positioning of the data transducer can freely be made regardless of a particular track pitch and controlled for fine adjustment by recognizing all the moving range of the data transducer in linear absolute position relationship.

It is a still further object of the present invention to provide a track following position control system adapted so that the higher trackability can be obtained by reducing the tracking error produced between the data transducer and the data track and also, a novel track following position control system adapted so that the track eccentricity and meander inherent in a removable media can be restricted.

It is a still further object of the present invention to provide a simple position control system adapted so that the track access control can be made with the use of a position control loop but not a velocity control loop.

It is a still further object of the present invention to provide a position control system adapted so that the occurrence of off-tracking can be discriminated with high accuracy.

The present invention is thus directed towards a data transducer position control system for positioning the data transducer which can read and/or write information data from and/or to a plurality of data tracks provided on the surface of a data disk, the system comprising:
  a positioning device for moving the data transducer on the disk surface;
  a position encoder for producing a current position signal indicating the current position of the positioning device upon detecting the displacement of movement of the same;
  a comparator for producing a deviation signal in correspondence with the deviation of the current position signal supplied from the position encoder from the reference position signal;

an electric angle calculator for calculating an electric angle signal in relation to the deviation for input power to the positioning device;

a function generator for producing plural phase signals, which are different from each other in phase, in accordance with the electric angle signal;

a power amplifier for feeding an electric current to each of plural windings in the positioning device after amplifying their respective plural phase signals;

a first servo loop including the positioning device, position encoder, comparator, electric angle calculator, and power amplifier so as to constitute a closed loop servo system;

a tracking error detector for producing a tracking error signal upon detecting the position error occurring between the data transducer and the data track;

a compensating position calculator for calculating the reference position signal in relation to the tracking error signal; and a second servo loop including the tracking error detector and compensating position calculator so as to constitute a closed loop servo system.

The present invention is further directed towards a data transducer position control system comprising:

a positioning device for moving the data transducer on the disk surface in accordance with reference position signal;

a position encoder for producing a current position signal indicating the current position of the positioning device upon detecting the displacement of movement of the same;

an electric angle calculator for calculating an electric angle signal in accordance with the reference position signal for input power to the positioning device;

a function generator for producing plural phase signals, which are different from each other in phase, in accordance with the electric angle signal;

a power amplifier for feeding an electric current to each of plural windings in the positioning device after amplifying their respective plural phase signals;

a tracking error detector for producing a tracking error signal upon detecting the position error occurring between the data transducer and the data track;

a compensating position calculator for calculating a compensating position signal, which will be added to the reference position signal, in relation to the tracking error signal; and a track deflection estimater for generating a feedforward signal, which will be added to the reference position signal, upon estimating the track deflection resulting from the track eccentricity and meander.

The present invention is still further directed towards a data transducer position control system comprising:

a positioning device for moving the data transducer on the disk surface;

a position encoder for producing a current position signal indicating the current position of the positioning device upon detecting the displacement of movement of the same;

a comparator for producing a deviation signal in correspondence with the deviation of the current position signal supplied from the position encoder from the reference position signal;

a power amplifier for feeding an electric current to a plurality of windings in the positioning device in accordance with the deviation signal;

a first servo loop including the positioning device, position encoder, comparator, and power amplifier so as to constitute a closed loop servo system;

a tracking error detector for producing a tracking error signal upon detecting the position error occurring between the data transducer and the data track;

a compensating position calculator for calculating a compensating position signal, which will be added to the reference position signal, in relation to the tracking error signal;

a second servo loop including the tracking error detector and compensating position calculator so as to constitute a closed loop servo system; and a position profile generator for generating a position profile signal, which will be added to the reference position signal, so that the data transducer can be moved from track to track by position trajectory control in accordance with particular information of track selection.

The present invention is still further directed towards a data transducer position control system comprising:

a positioning device for moving the data transducer on the disk surface;

a position encoder for producing a current position signal indicating the current position of the positioning device upon detecting; the displacement of movement of the same;

a comparator for producing a deviation signal in correspondence with the deviation of the current position signal supplied from the position encoder from the reference position signal;

a power amplifier for feeding an electric current to a plurality of windings in the positioning device in accordance with the deviation signal;

a first servo loop including the positioning device, position encoder, comparator, and power amplifier so as to constitute a closed loop servo system;

a tracking error detector for producing a tracking error signal upon detecting the position error occurring between the data transducer and the data track;

a compensating position calculator for calculating the reference position signal in relation to the tracking error signal;

a second servo loop including the tracking error detector and compensating position calculator so as to constitute a closed loop servo system; and an off-track discriminator including a simulator for producing a simulation signal of the current position signal as simulating in real time the whole or a part of operation of the first servo loop and an off-track detector for monitoring the off-tracking of the data transducer from the selected data track with using the current position signal and simulation signal.

Such arrangements according to the present invention offer the following operations and results.

As the current position is continuously detected and the phase of composite current magnetization vector in the plural windings is thus controlled, the positioning device can constantly produce a propelling force most efficiently. Accordingly, the state of out-of-stepping is prevented during either transient movement or high-speed seek operation and thus, the data transducer can securely move at a high speed and be actuated for adjustment.

Additionally, the data transducer can quickly be moved for settling to the selected data track without vibrating since appropriate control calculation is made in the electric angle calculator in accordance with the magnitude of deviation given by comparing the current position signal with the reference position signal. This will shorten the access time.

The position encoder monitors the current position of the positioning means with accuracy and in high resolution, whereby minimal adjustment can be made in positioning. Simultaneously, the stiffness is increased while the vibration impact is restricted to minimum, which will allow the data tracks to have higher density.

Also, the position encoder recognizes all the moving range of the data transducer in linear absolute position while the reference point has been defined as a datum point. Accordingly, the positioning regardless of a particular track pitch can be executed and in the positioning, the minimal adjustment can be made.

As appropriate compensating calculation is made in the compensating position calculation when the tracking error detector detects the position error occurring between the data transducer and the data track, the data transducer can run along the data track with accuracy during tracking. Accordingly, the data tracks are permitted to have higher density.

The track deflection estimater estimates the track eccentricity and meander and with the resultant data of track deflection, provides feedforward-like control during tracking movement, whereby the trackability can be improved in accuracy and consistency.

The position profile generation supplies information of position profile or moving trajectory for allowing the data transducer to access the newly selected data track to the reference position signal, so that the access control can be made as replaced with the position control and also, the system can be simple in arrangement.

The off-track discriminator monitors the movement of the data transducer and thus, the off-tracking can be discriminated with high accuracy.

As the positioning device in the servo loop is small in size and effective in operation to provide the feature of low power consumption, the disk storage drive system itself will be small in size and become portable.

DESCRIPTION OF THE PREFERRED EMBODIMENTS

Preferred embodiments of the present invention, in the form of a data transducer position control system for disk storage drive system, will be described in conjunction with the drawings.

Figure 1:
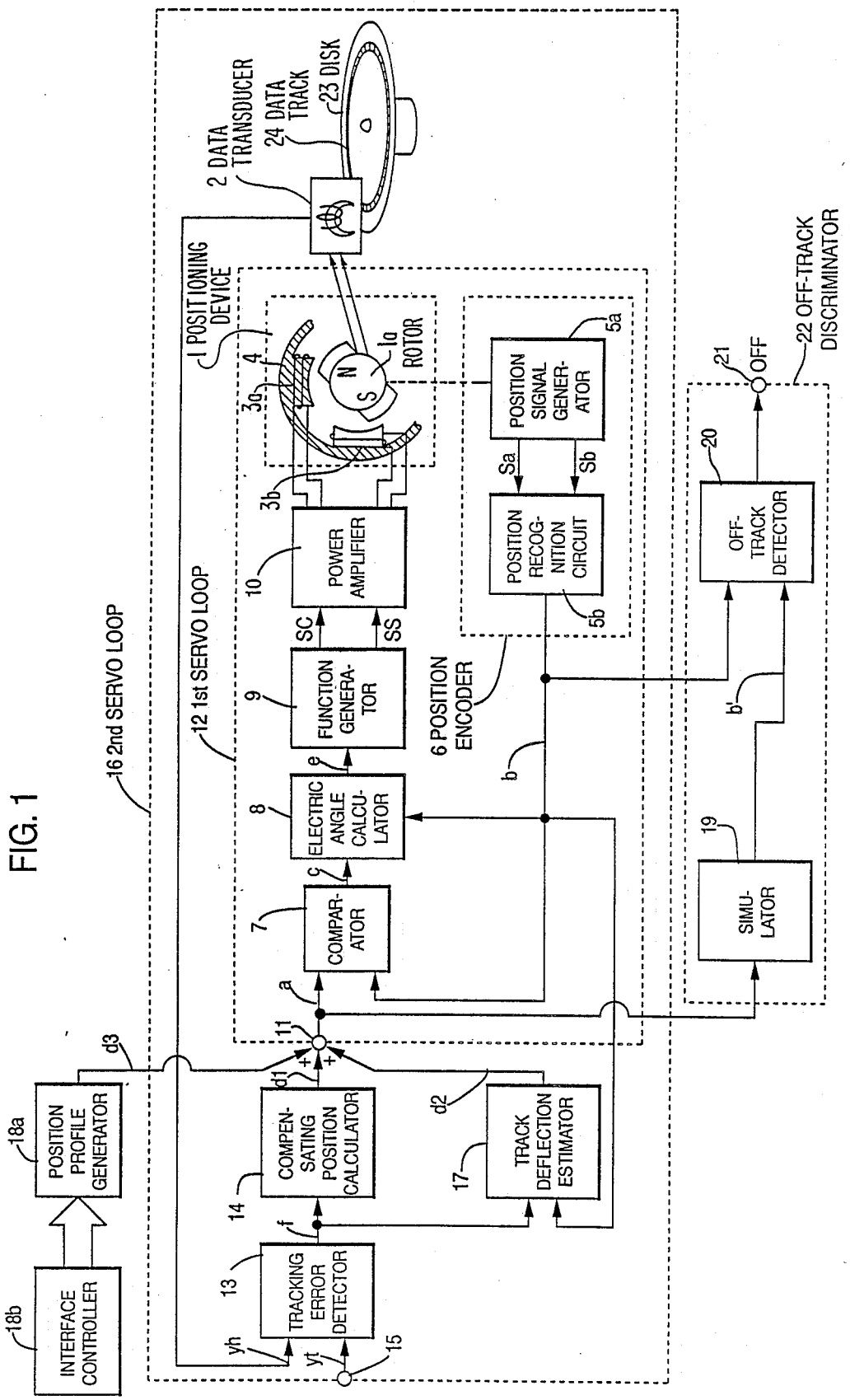
FIG. 1 is an explanatory diagram of one embodiment in the form of a data transducer position control system for disk storage drive system according to the present invention.

FIG. 1 is an explanatory diagram of an embodiment of the present invention in the form of a data transducer position control system for disk storage drive system employing a rotary actuator, e.g. a stepping motor, which acts as a positioning device. In FIG. 1, the numeral 1a is a rotor including permanent magnets and a toothed section (having magnetic pole teeth) provided of magnetic material. 3a and 3b are windings mounted on and around a magnetic material core. The windings 3a and 3b are incorporated with the magnetic material core to constitute a stator 4 which is spaced from and located opposite to the rotor 1a. Accordingly, the rotor 1a and the stator 4 in primary combination constitute a positioning device 1. 2 is a data transducer which is actuated by the positioning device 1 for access to a particular data track 24 on a disk 23. 5a is a position signal generator for producing a couple of 2-phase position signals of sine wave form sa and sb upon detecting the location of the rotor 1a (or indirectly, of the data transducer 2). 5b is a position recognizing circuit for producing a current position signal b of the rotor 1a in recognition with high resolution after receiving the 2-phase sine wave form position signals sa and sb from the position signal generator 5a. This current position signal b is a high resolution signal originated in a predetermined reference position, and present throughout the moving range of the data transducer 2 in linear absolute position. A combination of 5a and 5b will be termed as a position encoder 6 hereinafter. 7 is a comparator for producing a deviation signal c (=a−b) on receiving the current position signal b from the position recognizing circuit 5b and also, a reference position signal a which will be sent to an input for the reference position signal 11 thereof. 8 is an electric angle calculator for producing an electric angle signal e in appropriate control calculation after receiving the deviation signal c. 9 is a function generator for producing a couple of 2-phase sine wave form signals sc and ss which correspond to the electric angle signal e. 10 is a power amplifier for feeding power to the windings 3a and 3b respectively upon amplifying the 2-phase sine wave form signals sc and ss supplied from the function generator 9. All the components described above constitute a first servo loop 12 in the arrangement.

13 is a tracking error detector for detecting the relative position error of the data transducer 2 to the selected data track 24 on the disk 23 and producing a tracking error signal f. 14 is a compensating position calculator for producing a compensating position signal dl, which will also be sent to the reference position signal input 11, in specific compensating calculation based on the tracking error signal f. 15 represents an input yt of track deflection including the eccentricity and meander on the data track 24. 17 is a track deflection estimater for calculating the eccentricity and meander on the data track 24 for the purpose of improvement in the trackability. More particularly, the track deflection estimater 17 calculates the amount of eccentricity and meander on the data track 24 upon receiving the tracking error signal f and the current position signal b and then, produces a feedforward signal d2 which will be sent to the reference position signal input 11 and thus, summed to the reference position signal a. Accordingly, the combination of 2, 13, 14, and 17 in the arrangement constitutes a second servo loop 16.

18a is a position profile generator or means for allowing the data transducer 2 to access the newly selected data track 24 and arranged to produce a position profile signal d3 in accordance with the information of track selection supplied from an interface controller 18b. A position profile represents a position trajectory and more specifically, the moving location of the data transducer 2 is explained in the form of a function of time. It will however be fixed to a value corresponding to the location of the new track, after track access is completed. This signal d3 is also sent to the reference position signal input 11 and summed to the reference position signal a.

22 is an off-track discriminator comprising a simulator 19 and an off-track detector 20. The simulator 19 simulates the operation of the first servo loop 12 (containing the comparator 7, electric angle calculator 8, function generator 9, power amplifier 10, positioning device 1, and position encoder 6, and generates a simulation signal b' corresponding to the current position signal b. The off-track detector 20 produces an off-track signal (OFF) 21 when identifying the off-tracking by comparing the two signals b and b'.

Figure 2:
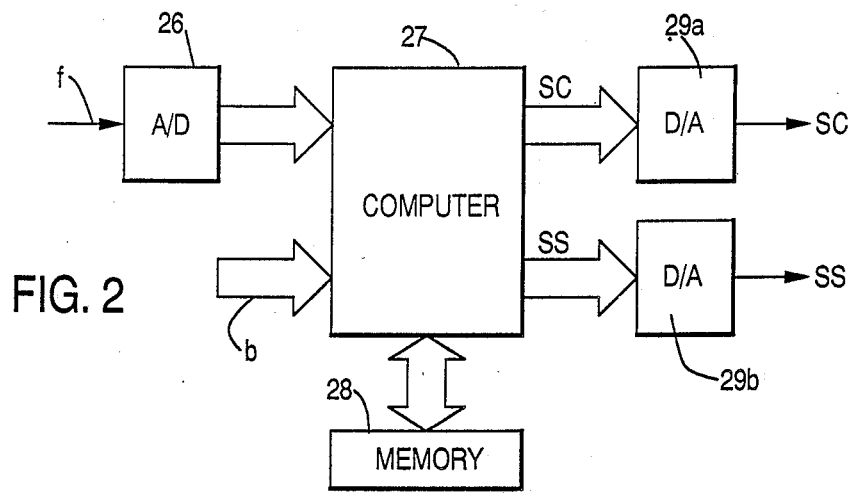
FIG. 2 is an explanatory diagram showing one arrangement which includes a comparator 7, an electric angle calculator 8, a function generator 9, and a compensating position calculator 14 incorporated in the embodiment of FIG. 1.

FIG. 2 illustrates the arrangement of the comparator 7, electric angle calculator 8, function generator 9, and compensating position calculator 14 of FIG. 1 according to the present invention. In this embodiment, the comparator 7, electric angle calculator 8, function generator 9, and compensating position calculator 14 are arranged in the form of a unit of an A/D converter 26, a computer 27, a memory 28, and D/A converters 29a and 29b. The A/D converter 26 converts the tracking error signal f supplied from the tracking error detector 13 into a digital signal. The computer 27 includes an arithmetic logical unit and a sequencer for control of the proceedings to operate according to the specified programs, described later, stored in the ROM area (read only memory area) of the memory 28. More specifically, the computer 27 fetches the output from the A/D converter 26 and the current position signal b from the position encoder 6, e.g. into the register or RAM (random access memory) area thereof, and processes the same by specific arithmetical operation and synthesis to produce the electric angle signal e. Then, the electric angle signal e is referred to a function table of sine-wave and cosine-wave stored in the ROM area of the memory 28 to produce a couple of 2-phase signals SC and SS which will be sent to the D/A converters 29a and 29b respectively. The D/A converters 29a and 29b convert the two 2-phase signals SC and SS in digital-to-analog conversion respectively and output the two 2-phase analog signals sc and ss.

The specified program stored in the ROM area of the memory 28 will briefly be described with reference to Figs. 3(a) and 3(b).

Figure 3A:
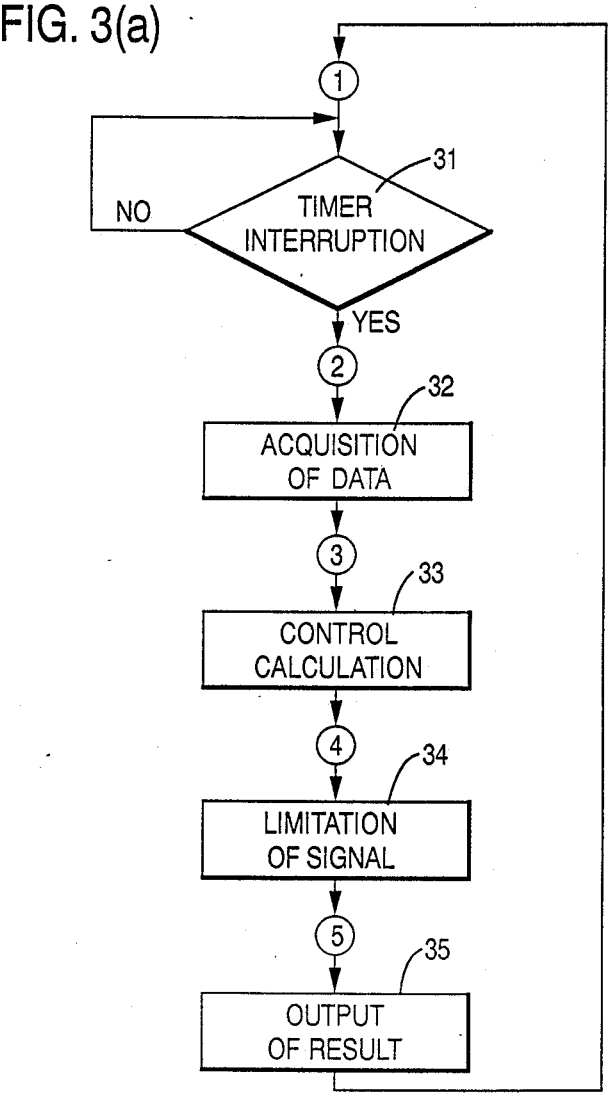
FIG. 3(a) is a basic flow chart of a first servo loop incorporated in the build-in program stored in the ROM area of a memory 28 of FIG. 2, according to the present invention.

FIG. 3(a) is a basic flow chart of the first servo loop incorporated with the program stored in the ROM area of the memory 28 shown in FIG. 2. This program starts from ① and at the first step of Process 31, there is an interruption from a timer. The timer produces an interruption signal once in a specified time τ1. If interrupted, the procedure moves to ②. Accordingly, the following procedures are carried out every sampling time τ1. Process 32 is for acquisition of data, where the current position signal b is fed and stored in the register or RAM area Qb. Process 33 is for control calculation, where the electric angle signal g is produced by specific control calculation based on the deviation signal c provided by comparison between the reference and current position signals a, b in order to allow the rotating position of the rotor 1a to coincide with the reference position. Process 34 is for limitation of signal, where the electric angle signal g is restricted within a limit for producing an electric angle signal h. Process 35 is for output of the result given by proceessing the preceding result in correcting calculation, where the two 2-phase signals SC and SS are produced by referring the current position signal b of the rotor 1a and the electric angle signal h produced at Process 34 to the function table of sine-wave and cosine-wave stored in the ROM area of the memory 28 and sent outward (to the D/A converters 29a and 29b respectively). After this process, the procedure returns to ①.

Figure 3B:
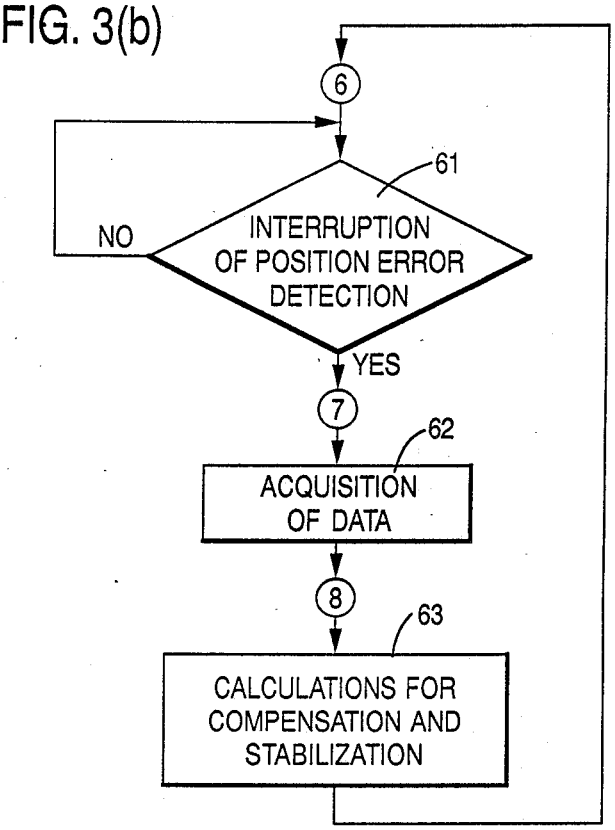
FIG. 3(b) is a basic flow chart of a second servo loop incorporated in the build-in program stored in the ROM area of the memory 28 of FIG. 2, according to the present invention.

FIG. 3(b) is a basic flow chart of the second servo loop incorporated with the program stored in the ROM area of the memory 28 shown in FIG. 2. This program starts from ⑥ and at the first step of Process 61, there is provided an interruption signal synchronized with the detection of a position error occurring between the data transducer 2 and the present data track. The interruption occurs once a specified time τ2. If interrupted, the procedure moves to ⑦. Accordingly, the following procedures are carried out every sampling time τ2; τ2 >≠1 in the embodiment. Process 62 is for acquisition of data, where the tracking error signal f converted to a digital signal by the A/D converter 26 is fed and stored in the register or RAM area Qf. Process 63 is for calculation for compensation and stabilization, where the reference position signal a is produced in reference to the tracking error signal f and the like. After this process, the procedure returns to ⑥.

The procedures from Process 32 to 35 of FIG. 3(a) will be described in more detail with reference to FIGS. 4(a), 4(b), 4(c) and 4(d).

Figure 4A:
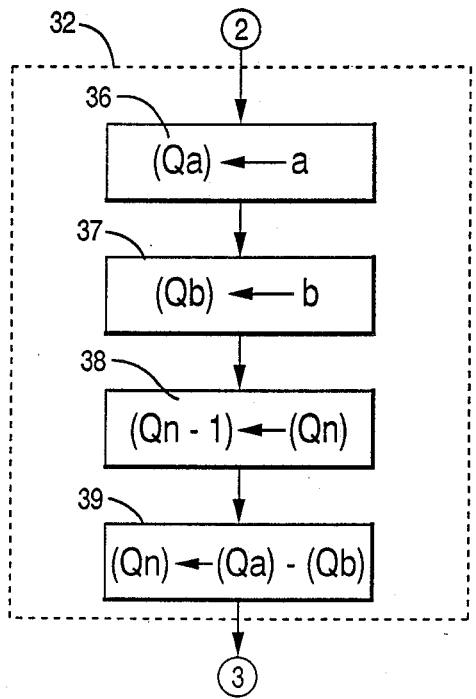
FIG. 4(a) is a flow chart explaining a process 32 of FIG. 3(a) according to the present invention.

FIG. 4(a) is a flow chart of Process 32 of FIG. 3(a). At Process 36 and 37, the reference and current position signals a and b are stored in the registers or RAM areas Qa and Qb respectively. At Process 38, the data including information of values obtained at the preceding sampling is transferred from the register or RAM area Qn to Qn−1. Qn represents the register or RAM area for storing a digital signal which corresponds to the deviation signal c produced by comparison between the reference position signal a and the current position signal b. At Process 39, the digital signal corresponding to the deviation signal c derived from the reference and current position signals a, b is processed by calculation (c =a−b, i.e. (Qn)←(Qa)−(Qb)) and stored in Qn. More specifically, a deviation signal produced by comparing the current position of the rotor 1a with the reference position is stored in Qn while a deviation signal produced at the preceding sampling is stored in Qn−1. These procedures are carried out in the comparator 7. (Qn) represents the content of Qn.

Figure 4B:
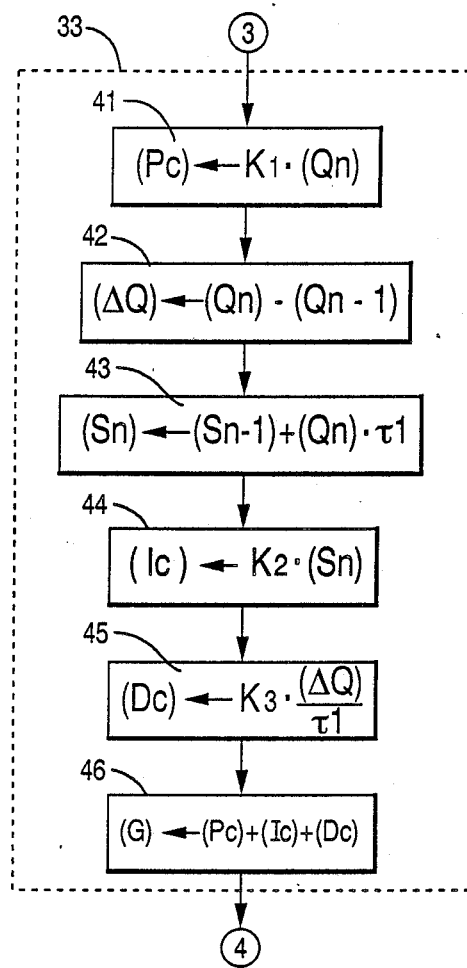
FIG. 4(b) is a flow chart explaining a process 33 of FIG. 3(a) according to the present invention.

FIG. 4(b) is a flow chart of Process 33 of FIG. 3(a). At Process 41, the content of Qn including the data corresponding to the present deviation signal c (=a−b) derived from the reference and current position signals a and b is multipled by K1 and the resultant data is then stored in the particular register or RAM area P. The content of P becomes a factor proportional to the content of Qn. At Process 42, the content of Qn−1 including the data which corresponds to the deviation signal c produced at the preceeding sampling, is subtracted from the content of Qn including the corresponding data to the present deviation signal c and the resultant data is then stored in the register or RAM area ΔQ. At Process 43, (Qn)·τ1 is calculated by multiplying the content of Qn by the sampling period τ1 and then, added to the content at the specified register or RAM area Sn−1 produced at the preceding sampling and the resultant data is stored in another area Sn. That is represented by the following equation (1) and the result of the calculation or a variable is stored in Sn.

$$(Sn)=(Sn-1)+(Qn)\cdot\tau1 \ldots \quad (1)$$

In the equation (1), the content of Qn represents the deviation signal c derived from the reference and current position signals a and b. Accordingly, if there is provided a static deviation between the reference position signal a and the current position signal b, the member (Qn)·τ1 is added to (Sn−1) at every samping operation. Consequently, the content of Sn increases as the time passes and thus, with the use of a corresponding closed loop servo system, the static deviation between the signals a and b can be eliminated. If the sampling period τ1 is substantially short, the content of Sn shown in the equation (1) represents the result of integrating the deviation signal c by time. Accordingly, Process 43 is for producing an integral factor by accumulating the amount of deviation by time. At Process 44, (Sn) is multiplied by K2 and the resultant data is stored in the specified register or RAM area I. The content of I becomes an integral signal. At Process 45, (ΔQ)/τ1 provided by providing the content of ΔQ by the sampling period τ1 is multiplied by K3 and the resultant data is stored in the specified register or RAM area D. Accordingly, Processes 42 and 45 are both for producing differential factors by differentiating the amount of deviation by time. The content of D becomes a differential signal. At Process 46, the contents of P, I, and D produced at Processes 41, 44, and 45 respectively are summed up to produce the electric angle signal g and the resultant data is stored in the specified register or RAM area G. The procedure then moves to ④. These procedures are known as P.I.D. compensation, providing stability in the system and increasing the stiffness (position holding torque against vibration disturbance) and the position traceability to the reference position signal a.

Figure 4C:
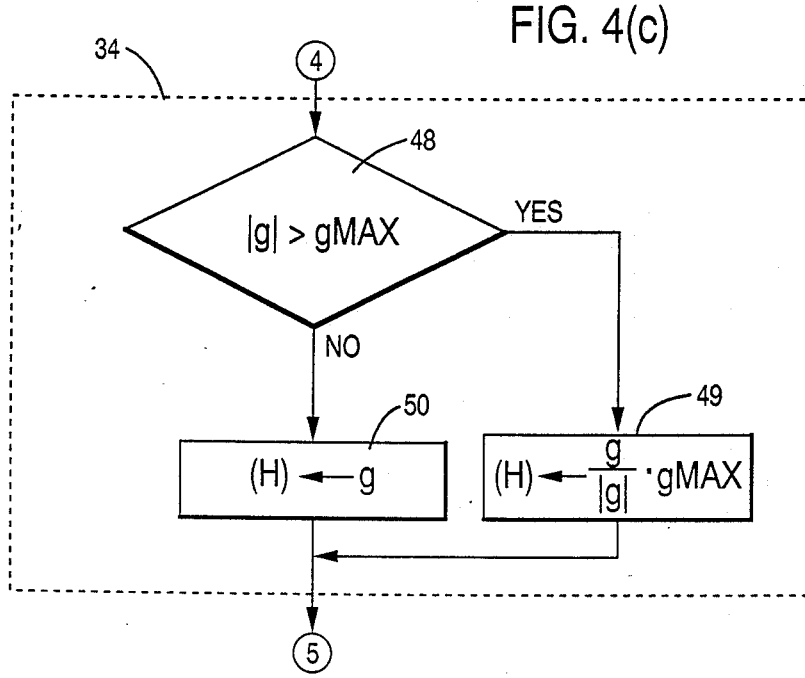
FIG. 4(c) is a flow chart explaining a process 34 of FIG. 3(a) according to the present invention.

FIG. 4(c) is a flow chart of Process 34 of FIG. 3(a). At Process 48, the absolute value of the electric angle signal g produced at Process 33 is compared with a predetermined constant gMAX. If $|g|>gMAX$, the procedure moves to Process 49. If not, the procedure moves to ⑤ after the signal g is transferred to the specified register or RAM area H for storage at Process 50. At Process 49, the signal g with its sign maintained and with its value made gMAX is stored in the area H before proceeding to ⑤. A signal from the area H is referred as an electric angle signal h. Process 34 is for restricting the electric angle in a particular range which is termed as electric angle limiter process as will be described in detailed function and principle hereinafter.

Figure 4D:
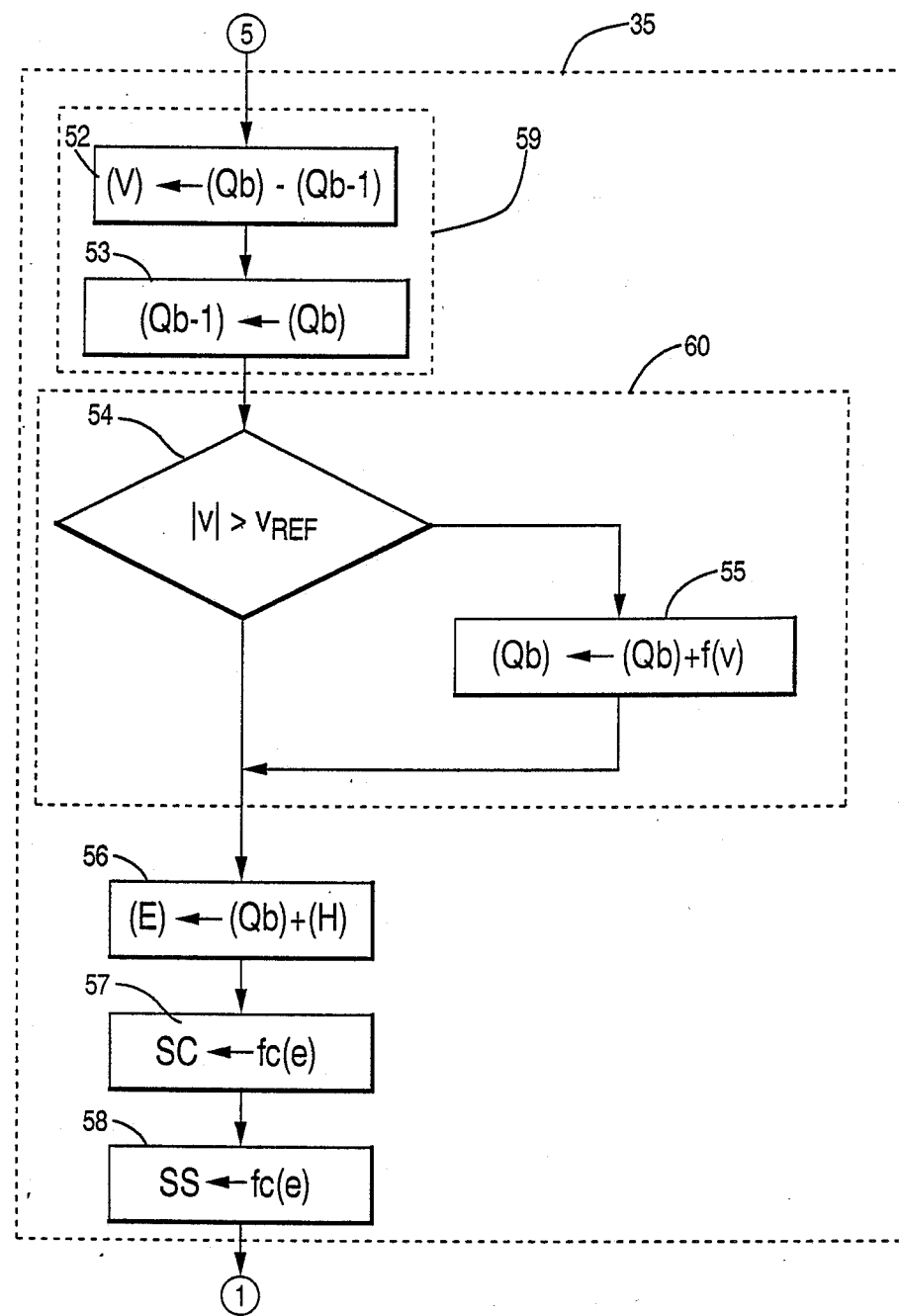
FIG. 4(d) is a flow chart explaining a process 35 of FIG. 3(a) according to the present invention.

FIG. 4(d) is a flow chart of Process 35 of FIG. 3(a). At Process 52, the difference between the current position signal b stored in the area Qb and the preceding current position signal b stored in the area Qb−1 is calculated and stored in the specified register or RAM area V with reference to a rotating velocity V of the rotor 1a. At Process 53, the current position signal b is transferred from the area Qb to Qb−1 for preparation for the following calculation. Processes 52 and 53 constitute Process 59 in the form of a velocity calculator for calculating the rotating velocity of the rotor 1a. At Process 54, (the absolute value of) the rotating velocity v is compared with a predetermined reference value $V_{REF}$. If the absolute value of the rotating velocity v is great enough to call for lead angle compensation, the procedure moves to Process 55. If not required, the procedure moves to Process 56. At Process 55, the magnitude of lead angle compensation f(v) corresponding to the velocity v is calculated from the data in the ROM area of the memory 28 and added to the current position signal b (stored in the area Qb) before restored in the area Qb. At Process 56, the electric angle signal h produced at Process 34 is summed with the compensated current position signal b to produce the electric angle signal e which is then stored in the specified register or RAM area E. These procedures for obtaining the electric angle signal e are carried out in the electric angle calculator 8. Processes 54 and 55 constitute Process 60 in the form of a lead angle compensator for generating and compensating the magnitude of lead angle in the electric angle according to the velocity of rotor 1a. Although the compensation f (V) is preliminarily added to the current position signal in the embodiment, it may be added to the electric angle signal h for the similar effect. The effect of the procedures from Process t9 to 60 (Process 52 to 55) will be described hereinafter.

At Process 57, a cosine-wave signal SC fc (e) is produced by referring the electric angle signal e (or particularly, its lower bits, as its upper bits being discarded) produced at Process 56 to the function table of cosine-wave stored in the ROM area of the memory 28. Similarly at Process 58, a sine-wave signal SS fs (e) is produced by referring the electric angle signal e to the function table of sine-wave stored in the ROM area of the memory 28. The two 2-phase signals SC and SS are finally sent to the D/A converters 29a and 29b respectively. These are executed in the function generator 9. (In addition, the subsequent procedures will be described with reference to FIGS. 1 and 2. The digital signals SC and SS are converted into their respective analog signals sc and ss by the D/A converters 29a and 29b respectively and transferred to the power amplifier 10. The two 2-phase signals sc and ss are electrically amplified in the power amplifier 10 and then, converted into corresponding 2-phase current signals (or voltage signals) for supply to the 2-phase windings 3a and 3b mounted on and around the magnetic material core of the stator 4.) The procedure in the program moves to the front ① of a sequence in FIG. 3(a) for awaiting for interruption from a timer.

The procedures from Process 62 to 63 of FIG. 3(b) will be described in detail with reference to FIGS. 5(a) and 5(b).

Figure 5A:
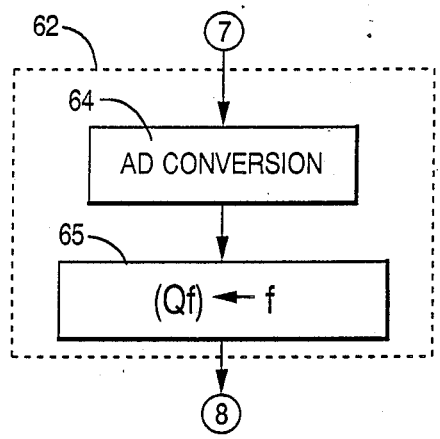
FIG. 5(a) is a flow chart explaining a process 62 of FIG. 3(b) according to the present invention.

FIG. 5(a) is a flow chart of Process 62 of FIG. 3(b). At Process 64, the tracking error signal f (or its original signal) is converted into a digital signal by the A/D converter 26. At Process 65, the digital tracking error signal f (or calculated from the original signal) is stored in the specified register or RAM area Qf. Then, the procedure moves to ⑧.

Figure 5B:
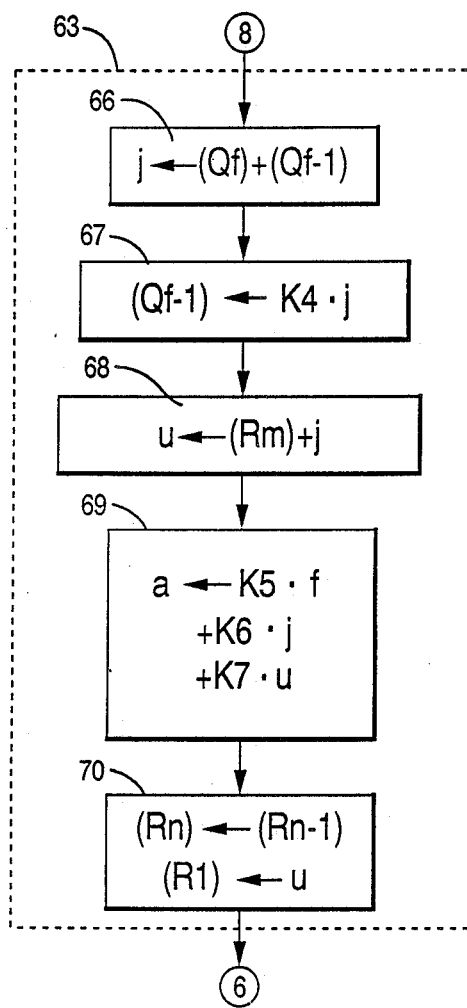
FIG. 5(b) is a flow chart explaining a process 63 of FIG. 3(b) according to the present invention.

FIG. 5(b) is a flow chart of Process 63 of FIG. 3(b). At Process 66, the contents of the area Qf (the tracking error signal f) and of the specified register or RAM area Qf-1 are summed and the result is represented by j. At Process 67, j is multiplied by K4 and the resultant data is stored in the area Qf−1 for the following calculation. K4 is a positive number of less than 1. The calculation is represented by an equation (2) shown at below.

$$j = (Qf) + K4 \cdot (Qf - 1) \qquad (2)$$
$$= (Qf) + K4 \cdot (Qf) \cdot z^{-1}$$

In the equation (2), z is a figure designated by z-transformation. If K4=1, j is given by integrating Qf (the content of the area Qf) by time. If 0<K4<1, j has the characteristic of time accumulativeness so as to increase the gain at the low frequency area f. In respect of servo control system, they are low frequency compensators (suppressing means for the static deviation or low frequency deviation). At Process 68, j is added to the content of Rm derived from the specified recursive register or RAM area Rn (n=1 to m) and the result is represented by u. At Process 69, f, j, and u are multiplied by K5, K6, and K7 (which are specific real numbers including zero) respectively and the results are summed to a. dl is a compensating position signal, as described previously. At Process 70, the data R1 to Rm in the recursive register or RAM areas are data shifted while u is stored in the area R1 for the subsequent calculation. Then, the procedure in the program moves to the front ⑥ in FIG. 3(b) for stand-by for an interruption synchronized with another operation of tracking error detection. More specifically, Processes 68 and 70 are associated with calculation for a recursive digital filter for the purpose of obtaining a particular high gain in relation to a basic frequency element of the rotating frequency of the disk or harmonic elements whose frequency is an integral multiple of the basic frequency, the elements being contained in the tracking error signal f, and also, of suppressing the deviation in the elements.

Figure 6A:
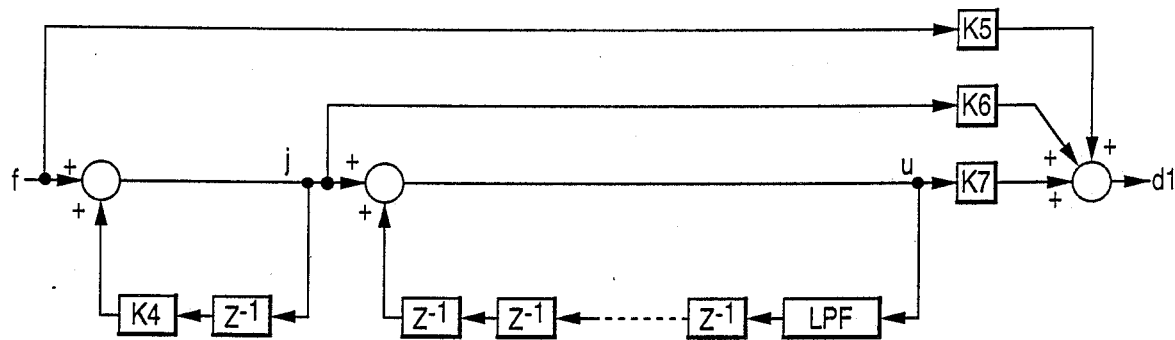
FIG. 6(a) is a block diagram showing a sequence of the process 63 of FIG. 5(b) in relation to FIG. 3(b), according to the invention.
Figure 6B:
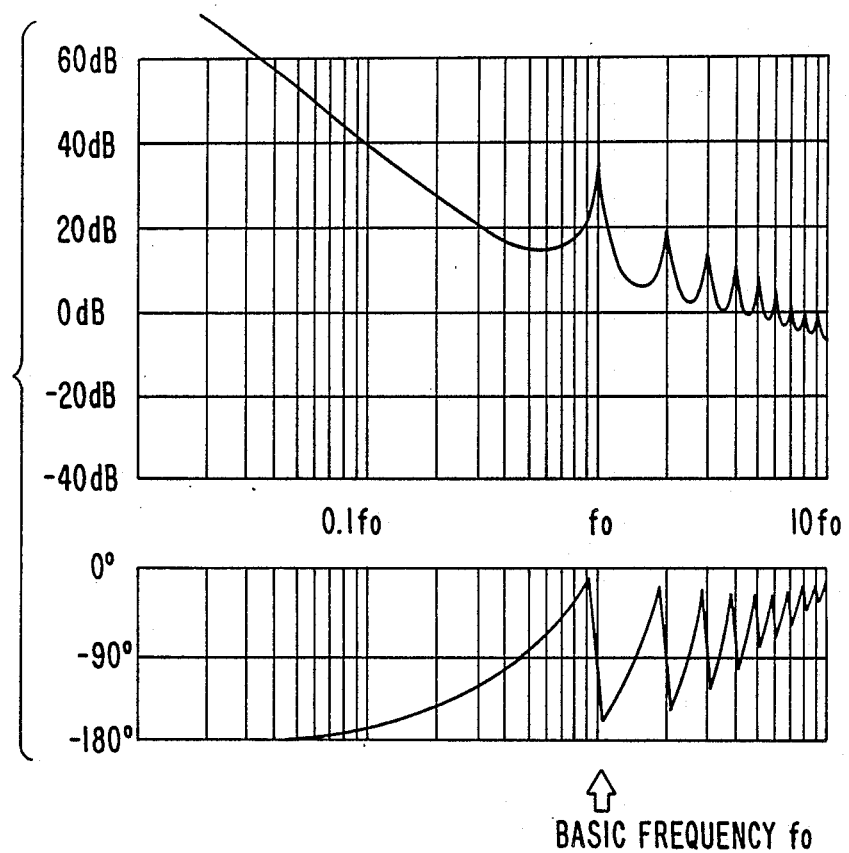
FIG. 6(b) is a frequency characteristic chart of a transfer-function representing a sequence from a tracking error signal f to a compensating position signal dl in the process 63 of FIG. 5(b) in relation to FIG. 3(b), according to the present invention.

FIGS. 6(a) and 6(b) are illustrations substantially explaining the operation of Process 63 of FIG. 3(b) with reference to FIG. 5(b). FIG. 6(a) is a block diagram of a sequence in Process 63 in which z is designated in z-transformation while $z^{-1}$ is a time delay element (such as a shift register). LPF, not shown in FIG. 5(b), represents a low pass filter contained in the recursive digital filter for stabilization. FIG. 6(b) is a characteristic chart of frequency response of the transfer functions covering from the tracking error signal f to the compensating position signal dl. fo is a basic frequency element of the rotating frequency of the disk included in the tracking error signal f. As shown, the integrally multiplied harmonic elements also involve a desired high gain. Accordingly by the procedures in the second servo loop shown in FIG. 3(b), the trackability of the data transducer 2 to the data track can be improved considerably.

Figure 7:
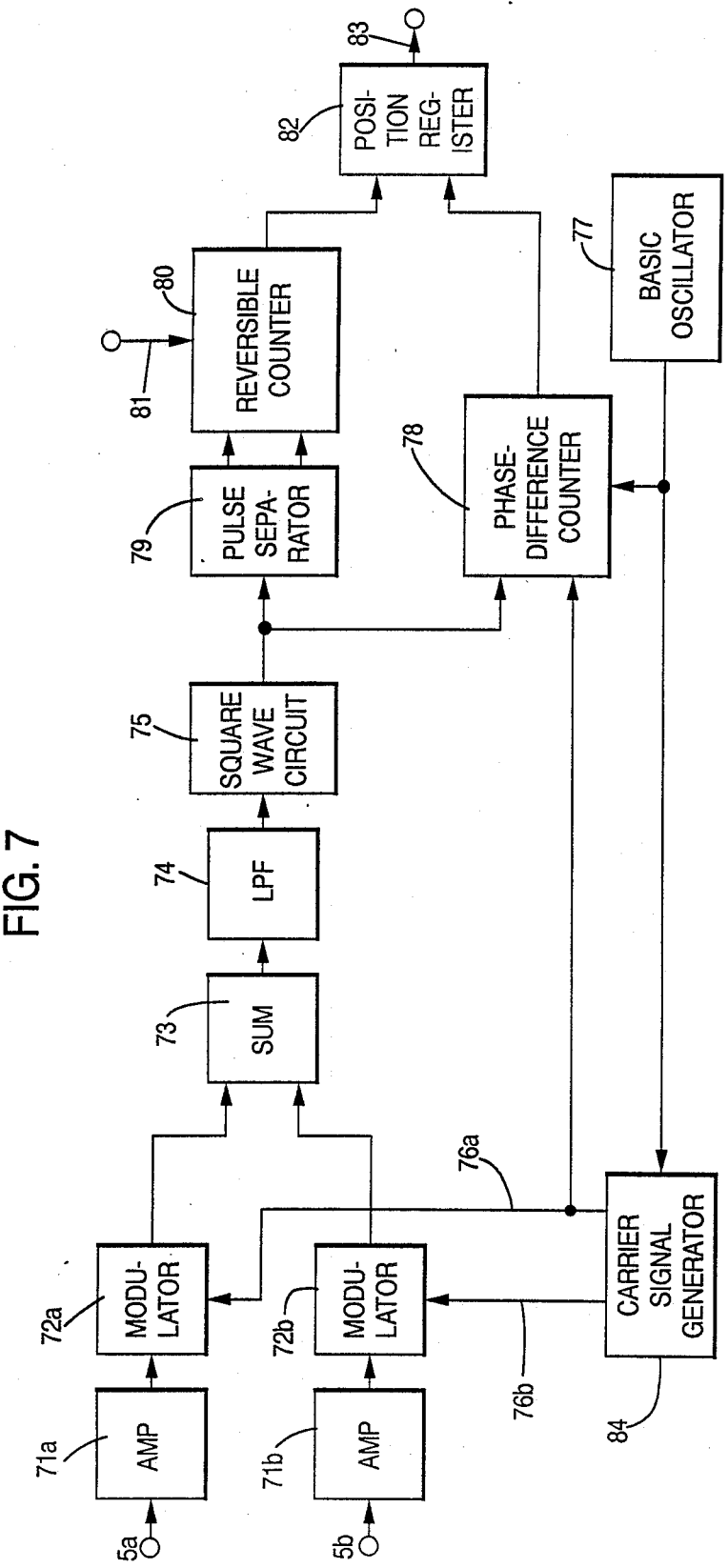
FIG. 7 is a block diagram of a position recognition circuit 5b in the position encoder 6 of FIG. 1, according to the present invention.

FIG. 7 is a block diagram of the position recognizing circuit 5b in the position encoder 6 of FIG. 1. As shown in FIG. 7, 71a and 71b are position signal amplifiers (AMP) for amplifying the 2-phase sine wave position signals sa and sb from the position signal generator 5a respectively. 72a and 72b are modulators or multipliers for modulating high frequency carrier signals 76a and 76b with the use of 2-phase sine wave signals from their respective signal amplifiers 71a and 71b. 84 is a carrier signal generator for producing the carrier signals 76a and 76b by frequency-dividing of a basic clock signal derived from a basic oscillator 77. The carrier signals 76a and 76b arranged at a phase angle of 90 degrees to each other are supplied from the carrier signal generator 84 to their respective modulators 72a and 72b. 73 is a summing circuit (SUM) for summing the two outputs from the modulators 72a, 72b. 74 is a low pass filter (LPF) for picking up only a basic frquency element of the summed modulation output from the summing circuit 73 while removing the harmonic elements. 75 is a square wave circuit for converting the basic frequency wave into a square wave. 78 is a phase-differential counter for measuring phase-information on the square wave. Accordingly, the phase-differential counter 78 is supplied with the carrier signal 76a, square signal from the square wave circuit 75, and basic clock signal from the basic oscillator 77. The phase-differential counter 78 indicates the phase-information in the form of a counting number, of which maximum counting-up value is n, and only can discriminate the phase within a range of period pitch of the position signal. To permit the measurement in a wide range, a reversible counter is provided for counting the number more than period pitch of the position signal, as represented by 80. 79 is a pluse separator for separating the content of the phase-differential counter 78, at each time when the content is changed 0→n or n→0, into an up-count pulse and a down-count pulse. The reversible counter 80 perofrms counting-up or countingdown upon receiving the up- or down-count pulse accordingly. 81 is an input of original/initial resetting for the reversible counter 80. 82 is a position register for summing the contents of the reversible counter 80 and phase-differential counter 78 in both the upper and lower bit portions. 83 is an output from the position recognition circuit 5b.

The principles cf the position recognition circuit 5b will then be described. When the two 2-phase sine wave signals from their respective position signal amplifiers 71a, 71b are EA($\theta$) and EB($\theta$), the resultant equations are:

$$EB(\theta) = E \cdot COS(2\pi\theta/\theta p) \ldots \quad (3a)$$

$$EB(\theta) = E \cdot SIN(2\pi\theta/\theta p) \ldots \quad (3b)$$

where $\theta$ = a rotating angle (location) of rotor 1a, $\theta p$ = period pitch of sine wave position signal from position signal generator 5a, and E = a peak value of sine wave position signal. When the carrier signals 76a and 76b are CA(t) and CB(t), the resultant equation are:

$$CA(\theta) = COS(2\pi fct) \ldots \quad (4a)$$

$$CA(\theta) = SIN(2\pi fct) \ldots \quad (4b)$$

where fc is a carrier frequency.

If P (t,$\theta$) is the result calculated in the summing circuit after modulation in the modulators 72a and 72b the resultant equation for P with reference to (3a), (3b), (4a), and (4b) is:

$$\begin{aligned} P(t, \theta) &= EA(\theta) \cdot CA(\theta) + EB(\theta) \cdot CB(\theta) \\ &= E\{COS(2\pi\theta/\theta p) \cdot COS(2\pi fct) + \\ &\quad SIN(2\pi\theta/\theta p) \cdot SIN(2\pi fct)\} \\ &= E \, COS(2\pi fct - 2\pi\theta/\theta p) \end{aligned} \quad (5)$$

This means that the carrier having the frequency fc includes a phase member $2\pi\theta/\theta p$. In the other words, the position information $\theta$ is shifted into a form of phase-information according to P (t,$\theta$). Accordingly, the position of the rotor 1a can be recognized by demodulating the phase information in P (t,$\theta$). To detect the position of the rotor 1a with accuracy through P (t,$\theta$), the wave forms of EA ($\theta$) and EB ($\theta$) should be of sine wave which is less distortive with respect to the rotating position $\theta$. If the distortion is great, the position detector will have the characteristics of more irregularity and less linearity. The low pass filter 74 also performs the removal of harmonic frequency elements from P (t,$\theta$). As the carrier signals 76a, 76b are employed of high harmonic wave (e.g. square wave), the low pass filter 74 is essential to the system.

The summed signal P (t,$\theta$) which is unusable without demodulation has to be demodulated to pick up the position information. According to the embodiment of the present invention, after the signal P (t,$\theta$) is converted into a square wave in the square wave circuit 75, the phase deviation of the signal P (t,$\theta$) from the carrier signal 76a is directly calculated with the use of a basic clock signal from the basic oscillator 77 in a demodulating method so that the highly resolutive position information can be obtained. 78 is a phase-differential counter for measuring the phase-information in the signal P (t,$\theta$), which is thus supplied with the carrier signal 76a, square wave signal converted from the signal P (t,$\theta$) in the square wave circuit 75, and basic clock signal from the basic oscillator 77. The phase-differential counter 78 starts counting of the basic clock signal when the carrier signal 76a rises up (or down) and continues it until the rise-up (or -down) of the signal P (t,$\theta$) is detected. Accordingly, the phase information ($2\pi\theta/\theta p$) in the signal P (t,$\theta$) can be picked up in the form of a counting number on the phase-differential counter 78. Also, as the carrier signal 76a has the frequency of fc, the phase measurement can be made at the resolution of 1/n to the period with the basic clock signal having the frequency of n times the frequency fc. This means that the resolution is 1/n to the phase $2\pi$ which corresponds to the period pitch $\theta p$ of the sine wave position signal from the position signal generator 5a. More particularly, the period pitch $\theta p$ of the position signal is interpolated at equal intervals of 1/n through the rotating angle. Accordingly, when $\theta p$ is small and n is great, the resolution can increase in accuracy and the position information can become smooth. The carrier signal generator 84 includes a frequency dividing circuit in which the output of basic oscillator 77 is divided by n to produce the 2-phase carrier signals 76a and 76b. The content of the phase-differential counter 78 is n at maximum and thus, can discriminate the phase in the range of the period pitch $\theta p$. To permit such measurement throughout a wide range as required in a common position control system, the reversible counter 80 is provided for counting the number exceeding the period pitch $\theta p$. The action of the pulse separator 79 is to send an up-count pulse or a down-count pulse to the reversible counter 80 when the content of the phase-differential counter 78 is changed 0→n or n→0 respectively. The contents of the reversible counter 80 and of the phase-differential counter 78 are summed up in both the upper and lower bit portions and stored in the position register 82 temporarily.

Figure 8:
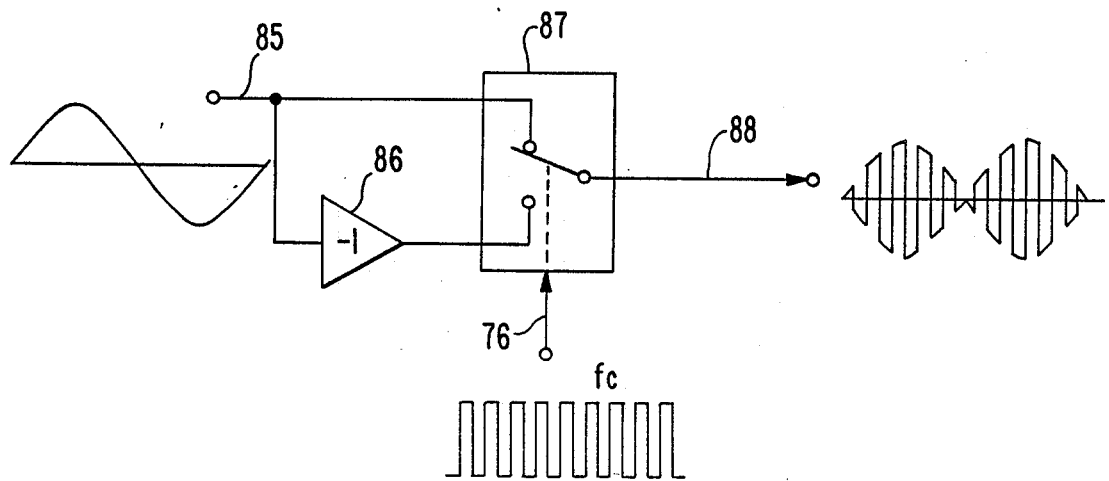
FIG. 8 is a circuit diagram of a modulator of FIG. 7 according to the present invention.

FIG. 8 is a circuit diagram of the modulator 72a or 72b. As shown in FIG. 8, 85 is a sine wave output E($\theta$) of the position signal amplifier 71a or 71b. 86 is an inverting amplifier (Gain $-1$) while 87 is a semiconductor switch controlled by the carrier signal 76 (of frequency fc). The semiconductor switch 87 is adapted to transfer the position signal E($\theta$) when the carrier signal 76 is on "H level" and an inverted position signal $-E(\theta)$ when on "L level" and thus, produce a modulation output 88.

According to the arrangement described above, the position of the rotor 1a is given in digital form at the position register 82. The encoder in the embodiment can be increased in the effect of resolution by increasing the factor n or the frquency of the basic clock signal from the basic oscillator 77. The reversible counter 80 is provided for counting the number when the position signal exceeds the period pitch $\theta p$ while the contents of the reversible counter 80 and of the phase-differential counter 78 are summed up in both the upper and lower bit portions for identifying the position of the rotor 1a, so that the present position can be detected, with the specified datum point defined as the reference point, linearly throughout the movable range (in proportion to the displacement of motion) and read in digital form with high accuracy of resolution for absolute positioning. This allows the system to be most preferably utilized for minimal positioning on a disk. It has been known that the stability becomes a bit low when the resolution is ⅛ of the pitch of data track (a distance between the centers of two adjacent tracks) and appropriate when 1/16 of the pitch. Thus, the resolution is required of less than 1/10 of the pitch. Consequently, the data transducer can freely be positioned, e.g. on the border line between two adjacent tracks, regardless of the track pitch.

The function and operation of the data transducer position control system for a disk storage drive system according to the present invention, shown in FIG. 1, will further be described in conjunction with the drawings. The description starts with the principles of torque generation and positioning in reference to FIG. 9.

Figure 9:
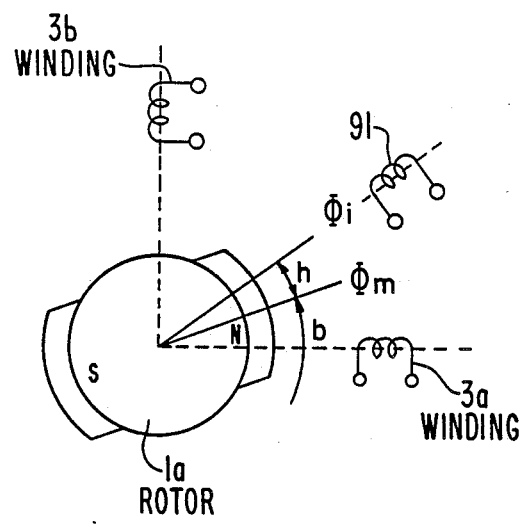
FIG. 9 is a schematic diagram showing a torque generator mechanism in a positioning device of FIG. 1 according to the present invention.

FIG. 9 is a schematical view showing a torque generation mechanism in the positioning device of FIG. 1, in which Φm represents a magnetic pole vector of the rotor 1a (which includes a permanent magnet having a pair of magnetic poles although in effect, multi-pole permanent magnet is employed) while 2-phase windings are designated by 3a and 3b. The position encoder 6 is arranged to detect the relative rotating position of the magnetic pole vector Φm to the windings 3a and 3b. The relative rotating position is represented by b which has a relative datum point and may range through more than $2\pi$ (=360 degrees). When the rates of electric current to the phases are IA and IB, the equation for generated torque in the phases is:

$$A \text{ phase } -Kt \cdot IA \cdot \text{SIN}(b) \tag{6a}$$

$$B \text{ phase } \quad Kt \cdot IB \cdot \text{SIN}(\pi/2 - b) \tag{6b}$$
$$= Kt \cdot IB \cdot \text{COS}(b)$$

(where Kt torque coefficient and b current position signal).

The current fed to the 2-phase windings 3a, 3b of the stator is then changed into a sine wave form according to the 2-phase signals sc and ss from the function generator 9. The function generator 9 is supplied with the electric angle signal e (=b+h) produced from the current position signal b of the rotor 1a compensated with lead angle and the electric angle signal h from the electric angle calculator 8 and then, produces the output of the 2-phase sine wave signals sc, ss corresponding to the signal e. Accordingly, the currents fed to the windings 3a, 3b are proportional to the 2-phase signals sc and ss from the function generator 9 respectively. Thus, $$IA = Io \cdot \text{COS}(b+h) \ldots \tag{7a}$$

$$IB = Io \cdot \text{SIN}(b+h) \ldots \tag{7b}$$

(where Io =current peak value).

This means that the current magnetization vector $\phi i$ of the windings 3a, 3b is designated in the position of b+h represented by 91 of FIG. 9. Then, the equation for the generated torque is, in reference to equations (6a), (6b), (7a), and (7b):

$$T = Kt \cdot Io \{-\text{SIN}(b) \cdot \text{COS}(b+h) + \text{COS}(b) \cdot \text{SIN}(b+h)\} \tag{8}$$
$$= Kt \cdot Io \cdot \text{SIN}(h)$$

The equation (8) shows that the position control of the rotor can be made in the position control system by adjusting the composite current magnetization vector $\phi i$ of the plural windings in reference to both the current position signal b and the deviation signal c produced from the current and reference position signals b and a. More specifically, when the variation h in the equation (8) is altered, the generation torque T changes and thus, will have the characteristic for positioning. For example, if the position of the rotor 1a is b−Δb and the reference position signal a is b, the deviation signal c is Δb and the value of h is determined. Then, the torque is produced, as calculated in the equation (8). As the result, the rotor 1a rotates until the value Δb becomes zero. When the rotor 1a reaches the position b, both the values Δb and h and the torque become zero. The electric angle calculator 8 produces the electric angle signal g by compounding proportional, differential, and integral factors of the deviation signal c from the comparator 7. The electric angle signal e based on g gives the rotor 1a the electric damping through the action of the differential factor which acts as a time differential signal. Accordingly, the vibration of the rotor 1a during positioning can be eliminated and the setting time can be shortened. Additionally, the static deviation between the reference position signal a and the current position signal b can be restricted by the action of the differential factor of the electric angle signal e. More particularly, for the reason that the deviation signal c (=a−b) is not zero when there is produced a deviation between the reference and current position signals a and b due to friction or loading, its integral factor increases as time passes according to the equation (1). This causes the current position signal b to become equal to the reference position signal a and thus, the static deviation can be controlled.

The function and principles of the electric angle limiter in Process 34 of FIG. 3 or 4(c) will be described in reference to FIGS. 10 and 11.

Figure 10:
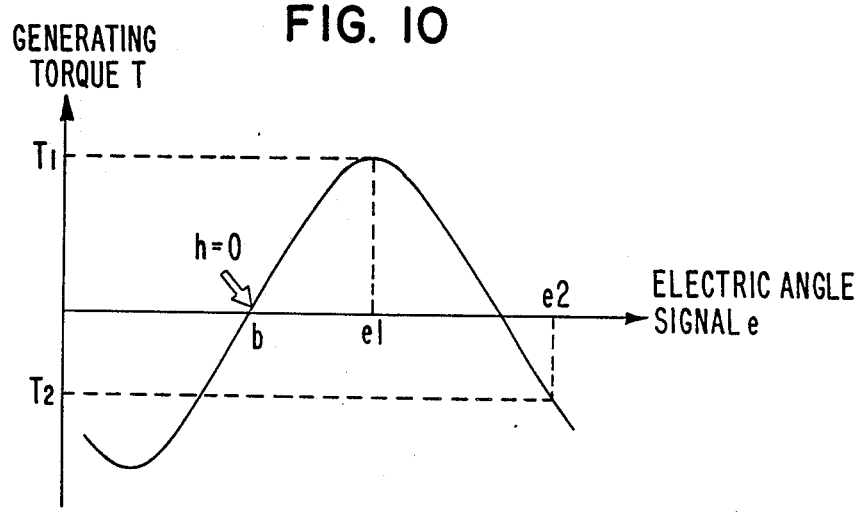
FIG. 10 is a static torque characteristic chart of the positioning device of FIG. 1 according to the present invention.

FIG. 10 is a static torque characteristic chart of the positioning device of one type, shown in FIG. 1, in the position control system for disk storage drive system according to the present invention. The generating torque T is on the y-axis while the electric angle e is on the x-axis. With reference to the equation (8), as the generating torque T is a sine wave function of the electric angle signal h, it will increase when the signal h becomes greater than zero. More particularly, the maximum torque T1 is given at the point e =e1, or h =$\pi/2$ [rad] and the torque T will reduce when h exceeds h =$\pi/2$ [rad]. When h exceeds $\pi$/[rad] and reaches the point e =e2, the sign of the generating torque becomes negative and the inverted torque T2 is produced. This results in unstablization in the control system and at worst, out-of-stepping. It is thus required to keep the absolute value of electric angle signal h less than $\pi/2$ [rad].

Figure 11:
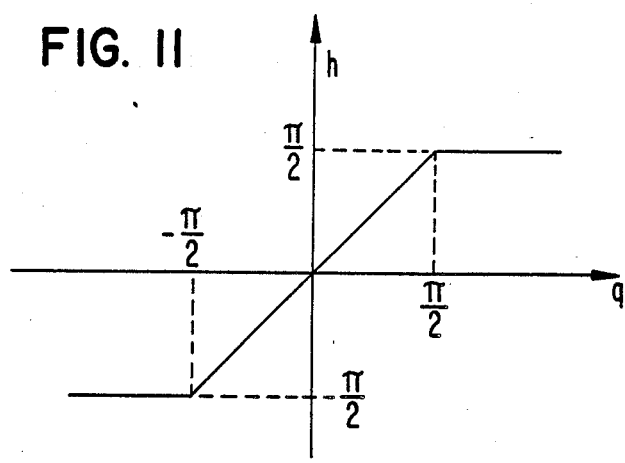
FIG. 11 is a characteristic chart showing the limiting characteristics of an electric angle limiter in the process 34 of FIG. 3 or 4(c), according to the invention.

FIG. 11 is a characteristic chart showing the limiting characteristics of electric angle control in Process 34 of FIG. 3 or 4(c). The absolute value of the electric angle signal g is compared with the predetermined constant gMAX (=$\pi/2$ [rad]) and limited within the range and the result becomes the electric angle signal h. Thus, the electric angle e is limited to an extent. Accordingly, even if the absolute value of electric angle signal calculated in the electric angle calculator exceeds $\pi/2$ [rad], the effective acceleration and deceleration can be effected by controlling the electric angle e so that the generating torque becomes maximum. More specifically, the rotor 1a rotates smoothly without out-of-stepping until it reaches the target position a given by the reference position signal. Although the limit g·MAX is π/2 according to the embodiment, it may be less than n for stable acceleration and deceleration.

The function and principles of the velocity calculator and the lead angle compensator in Processes 59 and 60 respectively shown in FIG. 4(d) will be described with reference to FIG. 12.

The velocity calculator in Process 59 is for obtaining a rotating velocity v of rotor 1a which will not particularly be calculated if having been given by a known means or in a known method. The rotating speed v is used for lead angle compensation at Process 60. The lead angle compensation is for having an electric angle of lead in relation to the rotating speed v for compensation. In this respect, the electric angle from the electric angle calculator 8 is advanced forward by a specified degree corresponding to the moving velocity in phase measure (angular measure). The preparatory compensation f (v) which corresponds to the velocity v and has been stored in the ROM area of the memory 28 is fetched out and used for compensation to produce the electric angle signal e. When the rotating velocity v of the rotor 1a increases, electrical or magnetic problems may arise. The lead angle compensation is intended to solve such problems, improve the torque generating efficiency (during rotation of the rotor 1a) of the positioning device, and shorten the track access time of the data transducer 2. The electrical problem can be caused by the inductance L of the windings 3a, 3b in the positioning device and more specifically, is such that even if the windings are activated by current-drive (a driving method in which an accurate rate of current is fed to the windings by negative feedback), the torque generating efficiency v decreases, as the rotating velocity v increases, due to a current rising-up delay resulting from a combination of resistance R, inductance L, and supply voltage E.

Figure 12:
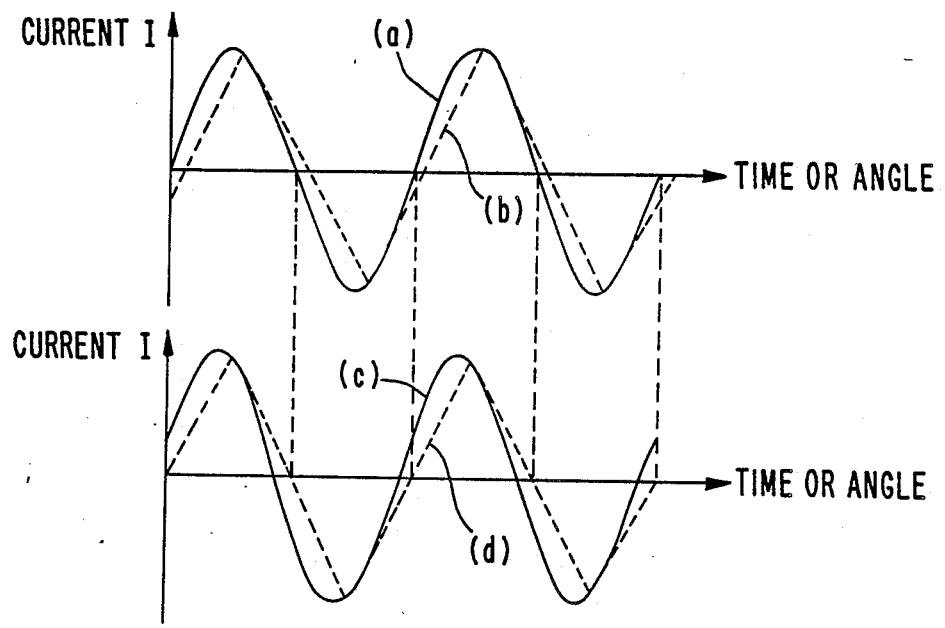
FIG. 12 is a chart explaining the lead angle compensation in relation to winding current, according to the present invention.

FIG. 12 is an explanatory illustration showing the relation between lead angle and winding current. The winding current is provided, when the rotating velocity v is great, having a waveform (b) present in effect while a waveform (a) represents a reference current without lead angle compensation. The current of the waveform (b) is aberrant and lags in phase behind the current of (a). Accordingly, the composed current magnetization Φi is delayed and the effective rotation of the rotor 1a will be prevented. A waveform (c) represents a reference current with lead angle compensation carried out while (d) represents a current present in effect. This reference current is in advance by an angle of lead and the current of the waveform (d) is thus not behind in phase although distorted in form. As a result, the torque generating efficiency will be improved considerably.

The magnetic problem can be caused by the eddy current loss in the magnetic circuit of the positioning device. As a result, the composed current magnetization Φi will be delayed in phase behind the current. This affects greatly when the rotating speed v is high and the similar effect to the electric problem will result. This can however be controlled by lead angle compensation.

The operation of the track deflection estimater 17, shown in FIG. 1, according to the present invention will be described. The tracking error detector 13 detects the relative tracking error signal f of the data transducer 2 to the data track 24. When the absolute position of the data transducer 2 is yh and the absolute position of the data track 24 with track deflection is yt, the equation for the tracking error signal f is:

$$f = yt - yh \ldots \quad (9)$$

The current signal b supplied from the position encoder 6 which has produced it on detecting the position of the rotor 1a represents the absolute position yh of the data transducer 2 as provided through a transfer mechanism. This is denoted by:

$$yh \approx b \ldots \quad (10)$$

Then, from the equations (9) and (10):

$$yt \approx f + b \ldots \quad (11)$$

From this equation (11), the tracking deflection of the data track 24 is estimated with the tracking error signal f and the current position signal b. The track deflection estimater 17 includes an adder for composing of the tracking error signal f and the current position signal b and can also provide other useful functions for control such as adjustment of scale factor and signal amplification. For the reason that the resultant estimation of the track deflection yt on the data track 24 is true, the signal d2 applied to the second servo loop with respect to the estimation of yt can be regarded as a so-called feedforward signal as it is infed to the second servo loop in accordance with the outside signal yt. Feedforward control is a control method in which an outside signal is applied to the inside of a servo loop and thus, controllability can be improved without losing the stability. In this embodiment of the present invention, as the estimation of the track deflection yt on the data track 24 acts as an outside signal to the second servo loop, the feedforward signal d2 can be applied to the inside of the second servo loop without affecting the stability in the same. Consequently, the trackability will be much improved. More particularly, this effect will be described. As the first servo loop is a closed loop servo system governed by the reference position signal a, an approximate equation is given by:

$$a \approx b \ldots \quad (12)$$

Then, from the equation (10), $$yh \approx a \ldots \quad (13)$$

This means that the position yh of the data transducer 2 is almost governed by the reference position signal a. Accordingly when a signal of the track deflection yt is added to the reference position signal a, the data transducer 2 will follow the signal a. Therefore, if a = yt:

$$yh \approx a \approx yt \ldots \quad (14)$$

This means that the data transducer 2 will approximately follow the track deflection yt of the data track 24. At the time, the tracking error signal f is quite small and the tracking error is almost disappeared. In this respect, the track deflection estimater 17 can also be provided in the form of a software. More particularly, its related program can be stored in the ROM area of the memory 28 of FIG. 2 for process in the computer 27.

The operation of the position profile generator 18a in the embodiment of FIG. 1 according to the present invention will be described. The position profile generator 18a is a means for allowing the data transducer 2 to access to a newly selected data track as producing the position profile signal d3 representing a trajectory from the current track to the new track in relation to the track selection information from the interface controller 18b. More specifically, it provides a time function for identifying the moving trajectory of the data transducer 2, which will in general be fixed to a value corresponding to the selected track position when the track access is completed. This signal is also applied to the reference position signal input 11 and summed with the reference position signal a. As the absolute position yh of the data transducer 2 is almost governed by the reference position signal as represented by the equation (13), the position profile permits free movements between the data tracks. During the period of access, the tracking control is not required and thus, the second servo loop is kept unactivated. It is desirable not to output at least the compensating position signal dl. However, with respect to the feedforward signal d2, the information about track deflection which involves rotational periodicity may be stored in a memory and utilized in access operations.

The method of access according to the present invention provides a great advantage that a control procedure can be facilitated. As compared to a velocity control method, employed for access operation in a common disk storage drive system, in which the velocity control loop is required separately from the position control loop, this method requires no velocity control loop, in which the position control loop can consecutively perform both tracking control and access control. Therefore, a circuit for shifting from velocity control to tracking control (position following control) is not required and no precision velocity measurement is required. Also, an unstable settling state which is inevitable in the shifting can be avoided.

Figure 13A:
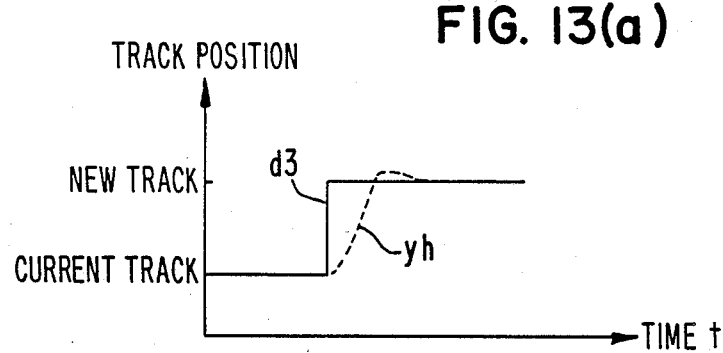
FIG. 13 (a), 13(b), and 13(c) are comparative charts showing the comparative relationship between position profile signals d3, which are supplied from a position profile generator 18a of FIG. 1, and locations yh of a data transducer 2, according to the present invention.
Figure 13B:
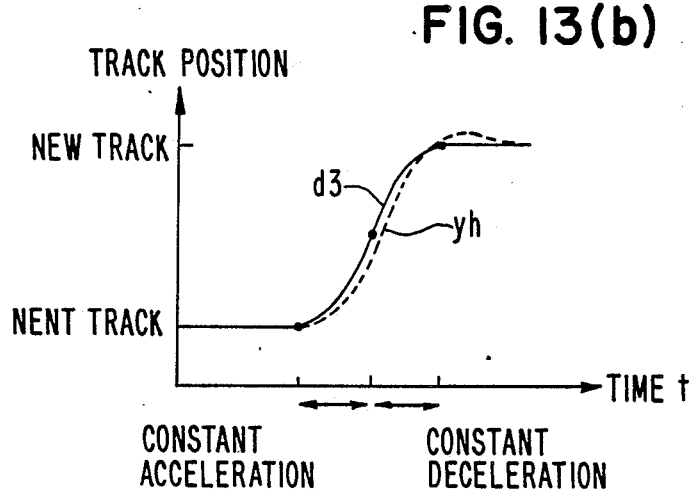
Figure 13C:
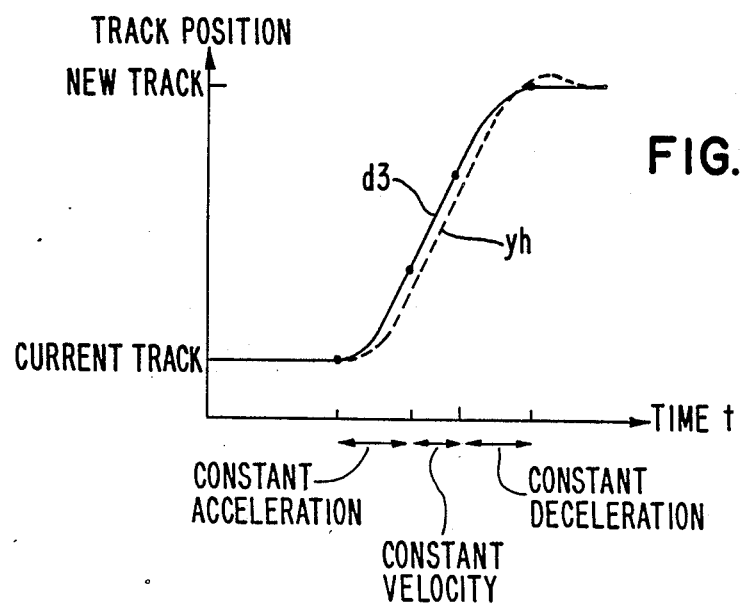

Illustrated in FIGS. 13(a), 13(b), and 13(c) is the comparative relation between the position profile signal d3 supplied from the position profile generator 18a and the position yh of the data transducer 2 following the same. FIG. 13(a) shows a step input and its response and more particularly, a trajectory employed for access to a less number of tracks. For access to a specified or small number of tracks, this trajectory can shorten an access time. FIG. 13(b) shows a trajectory employed for access to a medium number of tracks, as providing a profile involving constant deceleration after constant acceleration. FIG. 13(c) shows a trajectory employed for access to a distanced track, as providing a profile involving a manner in which constant acceleration, constant running at a constant speed, and constant deceleration are consecutively executed. It is understood that the position profile is not limited to such manners. The operation of the position profile generator 18a can also be provided in the form of a software. More specifically, its related program can be stored in the ROM area of the memory 28 of FIG. 2 for process in the computer 27.

The operation of the off-track discriminator 22 will then be described. As shown in FIG. 1, the embodiment preferably employs a particular tracking servo system termed as either a sampling servo method or a sector servo method. The second servo loop works with sampling data, as referred to as a time discrete system. A sampling period of discrete time is far from short when the accurate positioning of the data transducer is possible. Thus, the accurate absolute positioning depends on the first servo loop. It is however difficult for the data transducer to follow the data track which deflets as the disk rotates. The second servo loop 16 picks up the relative tracking error signal f of the data transducer 2 to the selected data track 24 for calculation in the compensating position calculator 14 so that the data transducer 2 can follow the target data track, thus including a time discrete processing system. Accordingly, a particular off-track discriminator is needed for the operation. The simulator 19 is arranged to simulate the first servo loop 12 of FIG. 1 in real time and more specifically, each block of elements in the loop for generating a simulation signal b' of the current position signal b supplied from the position encoder 6.

The case that vibration or impact is exerted from the outside will be described. The force disturbance such as external vibration or impact affects the positioning device 1 and all the other moving members connected to the positioning device 1 and including the data transducer 2. Consequently, the data transducer 2 vibrates and may cause off-tracking. As described above, the second servo loop 16 or more precisely, the tracking error detector 13 includes a time discrete processing system and can provide the tracking error signal f only at some intervals. This allows the off-tracking to be detected not in a moment while the position encoder 6 senses it instantly to have an effect on the current position signal b. The occurrence of off-tracking may be indicated by an abrupt change in the current position signal b but will not be discriminated with accuracy for the reason that the positioning device is likely to vibrate at considerable degree, even if no off-tracking is caused, during the tracking movement particularly on a disk which has track deflection to some extent. The simulator 19 which acts as a real time simulation model for the first servo loop is intended not to detect vibration and impact from the outside and thus, to cause no change. More particularly, the simulation signal b' remains unchanged. This allows the off-track detector 20 to compare the two signals b and b' for judgement of the occurrence of off-tracking, which will result in accurate discrimination.

Figure 14A:
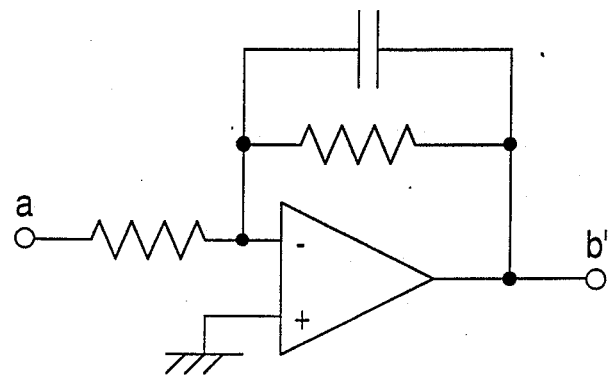
FIG. 14(a) and 14(b) are circuit diagrams of the simulator 19 of FIG. 1, according to the present invention.
Figure 14B:
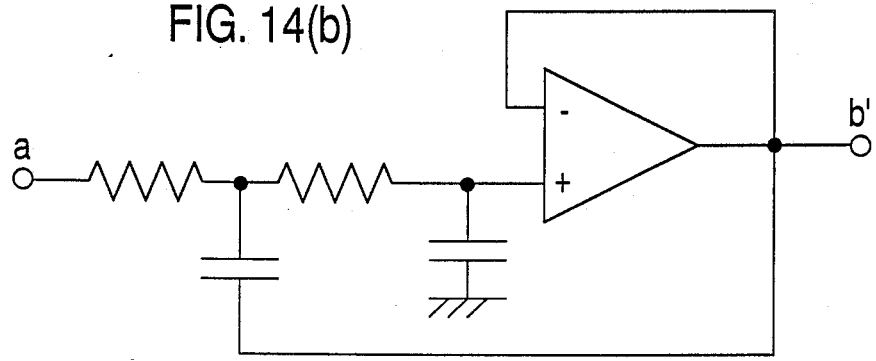

FIGS. 14(a) and 14(b) are circuit diagrams of the simulator 19 in reference to the embodiment. FIG. 14(a) shows a first order LPF (low pass filter) having an analog circuit while FIG. 14(b) shows a second order LPF having a similar analog circuit. When the reference and current position signals a, b are analog signals, these circuits operate appropriately. If digital signal are employed, the LPFs should be digital filters. Then, the digital calculation including the off-track detector 20 can be arranged in the form of a software with reference to the stored program. Also, a series of related procedures (a program) can be stored in the ROM area of the memory 28 of FIG. 2 for process in the computer 27.

It is known that such a simulator offers specific simulating effect in a simple LPF arrangement. For example, as it is arranged that the electric angle calculator 8 includes a deviation compensating factor such as an integrator and a stability compensating factor such as a differentiator, that both the power amplifier 10 and the encoder 6 have flat frequency characteristics, and that the positioning device 1 substantially has a frequency characteristic of low pass type (in which the gain becomes smaller continuously towards a high frequency area even if the frequency has general irregularity) due to the effect of inertia of the moving members, the characteristic given by comparing the current position signal b with the reference position signal a in the closed loop can be approximated by the first order LPF. Accordingly, when it is once more approximated by the second order LPF, the simulating effect will be improved in accuracy. Thus, it is not necessary for the simulator 19 to simulate all of the first servo loop 12. Partial simulation of a primary part will be satisfactory.

This embodiment can also employ a conventional motor with magnetic teeth such as a stepping motor for a drive mechanism of the positioning device. It may be a Hybrid Permanent Magnet type stepping motor having a magnet on either the rotor or the stator and magnetic teeth on both the same, a Variable Reluctance type stepping motor having magnetic teeth on both the rotor and stator, and a Permanent Magnet type stepping motor having a multi-pole magnetized magnet on the rotor and magnetic teeth on the stator. Any of the motors having magnetic teeth can provide a considerable force of torque at a small rate of current and thus, energy-saving and compactification will be possible in effect.

Although a 2-phase 2-winding motor is employed for the positioning device according to the present invention, a 3-phase motor or a motor of more than 3-winding may provide the same effect, however, the number of phases in the function generator 9 and power amplifier 10 should be adjusted accordingly. The function for the function generator 9 is not limited to a sine-wave form of SIN and COS but may have a form of periodically repeating waves. The function may also involve the generation of such a wave-form that a distortion in the waveform of a generating torque from the positioning device is compensated.

It will be understood that although a rotary motor is used for the positioning device in the embodiment of the present invention, a linear-motion device such as a linear motor can be employed for a similar effect.

Furthermore, the position signal generator 5a for the rotor 1a of the positioning device 1 is not limited to of rotary type but may be of linear type. Also, its output is not limited to a 2-phase and sine-wave form but may be of 3-phase or more.

The output from the position signal generator 5a may be of square-wave and more particularly, any precision form in so far as the current position signal b of specific resolution is obtained. The generator 5a may be also an absolute encoder. In view of the fact that the resolution required for the positioning device in the disk storage drive system is less than micrometer order (Sub-micron) in linear conversion, the combination of a position signal generator and a position recognition circuit, described above in detail, will be most preferred as providing the satisfactory effect of resolution in a simple manner and at low cost.

Furthermore, although each of the processes shown in FIG. 2, 3(a), and 3(b) is described in software measure, it may be carried out in a hardware arrangement.

Furthermore, the block diagram of FIG. 6(a) may be modified without departing from the scope of the present invention. More particularly, a change in the orderly arrangement of the low pass compensator and the recursive digital filter and modifications of the same will be possible.

What is claimed is:

1. A data transducer position control system for data disk storage drive system having a data transducer adapted to write and/or read information data to and/or from a plurality of data tracks provided on the surface of a data disk, comprising:

a positioning device for moving the data transducer on the disk surface;
position encoder means for producing a current position signal indicating the current position of the positioning device upon detecting the displacement of movement of the same;
comparator means for producing a deviation signal in correspondence with the deviation of the current position signal supplied from the position encoder from a reference position signal;
electric angle calculator means for calculating an electric angle signal in relation to the deviation for input power to the positioning device;
function generator means for producing plural phase signals, which are different from each other in phase, in accordance with the electric angle signal;
a power amplifier for feeding an electric current to each of plural windings in the positioning device after amplifying their respective plural phase signals;
first servo loop means including the positioning device, position encoder, comparator means, electric angle calculator means, and power amplifier so as to constitute a closed loop servo system;
tracking error detector means for producing a tracking error signal upon detecting the position error occurring between the data transducer and the data track;
compensating position calculator means for calculating the reference position signal in relation to the tracking error signal; and
second servo loop means including the tracking error detector means and compensating position calculator means so as to constitute a closed loop servo system.

2. A system according to claim 1, wherein the positioning device is provided with a magnetic material having groups of magnetic pole teeth of toothed form arranged at regular intervals of pitch and mounted on either the stator or the rotor thereof.

3. A system according to claim 1, wherein the position encoder means is arranged for resolution of more than 1/10-pitch interpolation in a data track while its current position signal output represents the displacement of current movement of the positioning device throughout the linear movable range in the absolute position measure with a specified datum point defined as a reference point.

4. A system according to claim 1, wherein the position encoder means comprises position signal generator means for producing plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal.

5. A system according to claim 1, wherein the electric angle calculator means is arranged to produce a composed electric angle signal including a proportional factor proportional to the magnitude of deviation of an output of the comparator means and a differential factor for differentiation of the deviation output of the comparator means by time.

6. A system according to claim 1, wherein the electric angle calculator means is arranged to produce a composed electric angle signal including an integral factor for accumulation of the deviation output of the comparator means by time.

7. A system according to claim 1, wherein the electric angle calculator means is arranged to have process of specific digital calculation of the deviation output of the comparator means and digital addition of the current position signal for producing an electric angle signal in accordance with the lower bits of the result while the upper bits being discarded.

8. A system according to claim 1, wherein the electric angle calculator means includes electric angle limiter means for restricting the result given by specific digital calculation of the deviation output of the comparator means within a predetermined range.

9. A system according to claim 1, wherein the electric angle calculator means includes lead angle compensator means for leading the electric angle signal in angular measure in accordance with a moving velocity of the positioning device.

10. A system according to claim 9, wherein the electric angle calculator means further includes velocity calculator means for calculation of the moving velocity of the positioning device.

11. A system according to claim 9, wherein the lead angle compensator means includes memory means for tablization of data about the lead angle compensation to the moving velocity of the positioning device so that the data can be read out in relation to the moving velocity for lead angle compensation.

12. A system according to claim 1, wherein the function generator means includes memory means for tabularization of data designated by a particular function so that the data of function can be read out for producing plural phase signals which are different from each other in phase.

13. A system according to claim 1, wherein the function generator means is provided with a periodic function.

14. A system according to claim 1, wherein the function generator means is provided with an approximate sine wave form of plural phase as a function.

15. A system according to claim 1, wherein the compensating position calculator means includes low frequency compensating means for increasing the gain of low frequency elements contained in the tracking error signal.

16. A system according to claim 1, wherein the compensating position calculator means includes a recursive digital filter for having a particular high gain in the harmonic elements which are of an integral multiple of basic frequency element in a rotating period of a disk medium and contained in the tracking error signal.

17. A system according to claim 1, wherein the combination of the comparator means, electric angle calculator means, function generator means, and reference position calculator means is incorporated with memory means for storing program data of process information, sequencer means for controlling the proceedings of process, and arithmetic logical unit means for executing the process of calculation in accordance with the program data.

18. A data transducer position control system for data disk storage drive system having a data transducer adapted to write and/or read information data to and/or from a plurality of data tracks provided on the surface of a data disk, comprising:

a positioning device for moving the data transducer on the disk surface in accordance with a reference position signal, provided with a magnetic material having groups of magnetic pole teeth of toothed form arranged at regular intervals of pitch and mounted on either the stator or the rotor thereof;

position encoder means for producing a current position signal representing the current position of the positioning device upon detecting the displacement of movement of the same;

comparator means for producing a deviation signal in correspondence with the deviation of the current position signal supplied from the position encoder means from the reference position signal;

electric angle calculator means incorporated with process for specific digital calculation of the deviation output of the comparator means and digital addition of the current position signal so as to calculate an electric angle signal representing the input power to the positioning device in accordance with the lower bits of the result while the upper bits being discarded;

function generator means provided with a memory means for tabularization of data designated by a particular function so as to produce plural phase signals, which are different from each other in phase, upon reading the data of function in accordance with the electric angle signal;

a power amplifier for feeding an electric current to each of plural windings in the positioning device after amplifying their respective plural phase signals;

first servo loop means includig the positioning device, position encoder means, comparator means, electric angle calculator means, function generator means, and power amplifier so as to constitute a closed loop servo system;

tracking error detector means for producing a tracking error signal upon detecting the position error occurring between the data transducer and the data track;

compensating position calculator means for calculating the reference position signal in relation to the tracking error signal; and second servo loop means including the tracking error detector means and compensating position calculator means so as to constitute a closed loop servo system.

19. A system according to claim 18, wherein the electric angle calculator means includes electric angle limiter means for restricting the result given by specific digital calculation of the deviation output of the comparator means within a predetermined range.

20. A system according to claim 18, wherein the electric angle calculator means includes lead angle compensator means for leading the electric angle signal in angular measure in accordance with a moving velocity of the positioning device.

21. A system according to claim 20, wherein the electric angle calculator means further includes velocity calculator means for calculation of the moving velocity of the positioning device.

22. A system according to claim 20, wherein the lead angle compensator means includes memory means for tabularization of data about the lead angle compensation to the moving velocity of the positioning device so that the data can be read out in relation to the moving velocity for lead angle compensation.

23. A data transducer position control system for data disk storage drive system having a data transducer adapted to write and/or read information data to and-/or from a plurality of data tracks provided on the surface of a data disk, comprising:

a positioning device for moving the data transducer on the disk surface in accordance with a reference position signal;

position encoder means provided with position signal generator means for producing plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal, said position encoder means having the resolution of more than 1/10-pitch interpolation in a data track while its current position signal output represents the displacement of current movement of the positioning device throughout the linear movable range in the absolute position measure with a specified datum point defined as a reference point;

comparator means for producing a deviation signal in correspondence with the deviation of the current position signal supplied from the position encoder means from the reference position signal;

electric angle calculator means for calculating an electric angle signal in relation to the deviation for input power to the positioning device;

function generator means for producing plural phase signals, which are different from each other in phase, in accordance with the electric angle signal;

a power amplifier for feeding an electric current to each of plural windings in the positioning device after amplifying their respective plural phase signals;

first servo loop means including the positioning device, position encoder means, comparator means, electric angle calculator means, function generator means, and power amplifier so as to constitute a closed loop servo system;

tracking error detector means for producing a tracking error signal upon detecting the position error occurring between the data transducer and the data track;

compensating position calculator means for calculating the reference position signal in relation to the tracking error signal; and second servo loop means including the tracking error detector means and compensating position calculator means so as to constitute a closed loop servo system.

24. A data transducer position control system for data disk storage drive system having a data transducer adapted to write and/or read information data to and-/or from a plurality of data tracks provided on the surface of a data disk, comprising;

a positioning device for moving the data transducer on the disk surface in accordance with a reference position signal;

position encoder means for producing a current position signal representing the current position of the positioning device upon detecting the displacement of movement of the same;

electric angle calculator means for calculating an electric angle signal in relation to the reference position signal for displacement of the positioning device;

function generator means for producing plural phase signals, which are different from each other in phase, in accordance with the electric angle signal;

a power amplifier for feeding an electric current to each of plural windings in the positioning device after amplifying their respective plural phase signals;

tracking error detector means for producing a tracking error signal upon detecting the position error occurring between the data transducer and the data track;

compensating position calculator means for producing a compensating position signal, which will be added to the reference position signal, in accordance with the tracking error signal; and track deflection estimater means for generating a feed-forward signal, which will be added to the reference position signal, upon estimating the track deflection resulting from the track eccentricity and meander.

25. A system according to claim 24, wherein the positioning device is provided with a magnetic material having groups of magnetic pole teeth of toothed form arranged at regular intervals of pitch and mounted on either the stator or the rotor thereof.

26. A system according to claim 24, wherein the position encoder means is arranged for resolution of more than 1/10-pitch interpolation in a data track while its current position signal output represents the displacement of current movement of the positioning device throughout the linear movable range in the absolute position measure with a specified datum point defined as a reference point.

27. A system according to claim 24, wherein the position encoder means comprises position signal generator means for producing plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal.

28. A system according to claim 24, wherein the electric angle calculator means is arranged to have process of specific digital calculation of the deviation output of the comparator means for producing an electric angle signal in accordance with the lower bits of the result while the upper bits being discarded.

29. A system according to claim 24, wherein the function generator means includes memory means for tabularization of data designated by a particular periodic function so that the data of function can be read out for producing plural phase signals which are different from each other in phase.

30. A system according to claim 24, wherein the function generator means is provided with an approximate sine wave form of plural phase as a function.

31. A system according to claim 24, wherein the compensating position calculator means includes low frequency compensating means for increasing the gain of low frequency elements contained in the tracking error signal.

32. A system according to claim 24, wherein the compensating position calculator means includes a recursive digital filter for having a particular high gain in the harmonic elements which are of an integral multiple of basic frequency element in a rotating period of a disk medium and contained in the tracking error signal.

33. A system according to claim 24, wherein the track deflection estimator means includes addition means for summing the tracking error signal output from the tracking error detector means and the current position signal output from the position encoder means.

34. A system according to claim 24, wherein the track deflection estimator means includes memory means for storing the information of track deflection so that the track deflection can be given in the form of a feedforward signal during the movement of the data transducer between the data tracks.

35. A system according to claim 24, wherein the combination of the electric angle calculator means, function generator means, compensating position calculator means, and track deflection estimator means is incorporated with memory means for storing program data of process information, sequencer means for controlling the proceedings of process, and arithmetic logical unit means for executing the process of calculation in accordance with the program data.

36. A data transducer position control system for data disk storage drive system having a data transducer adapted to write and/or read information data to and/or from a plurality of data tracks provided on the surface of a data disk, comprising:
- a positioning device for moving the data transducer on the disk surface in accordance with a reference position signal, provided with a magnetic material having groups of magnetic pole teeth of toothed form arranged at regular intervals of pitch and mounted on either the stator or the rotor thereof;
- position encoder means provided with position signal generator means for producing plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal, said position encoder means having the resolution of more than 1/10-pitch interpolation in a data track while its current position signal output represents the displacement of current movement of the positioning device throughout the linear movable range in the absolute position measure with a specified datum point defined as a reference point;
- electric angle calculator means for calculating an electric angle signal in accordance with the reference position signal for displacement of the positioning device;
- function generator means provided with memory means for tabularization of data designated by a particular periodic function so that the data of function can be read out from the memory means in accordance with the electric angle signal for producing plural phase signals which are different from each other in phase;
- a power amplifier for feeding an electric current to each of plural windings in the positioning device after amplifying their respective plural phase signals;
- tracking error detector means for producing a tracking error signal upon detecting the position error occurring between the data transducer and the data track;
- compensating position calculator means for producing a compensating position signal, which will be added to the reference position signal, in accordance with the tracking error signal; and
- track deflection estimator means provided with an addition means for summing the tracking error signal output form the tracking error detector means and the current position signal output from the position encoder means so as to generate a feed-forward signal, which will also be added to the reference position signal, upon estimating the track deflection resulting from the track eccentricity and meander.

37. A system according to claim 36, wherein the compensating position calculator means includes low frequency compensating means for increasing the gain of low frequency elements contained in the tracking error signal.

38. A system according to claim 36, wherein the compensating position calculator means includes a recursive digital filter for having a particular high gain in the harmonic elements which are of an integral multiple of basic frequency element in a rotating period of a disk medium and contained in the tracking error signal.

39. A data transducer position control system for data disk storage drive system having a data transducer adapted to write and/or read information data to and/or from a plurality of data tracks provided on the surface of a data disk, comprising:
- a positioning device for moving the data transducer on the disk surface;
- position encoder means for producing a current position signal representing the current position of the positioning device upon detecting the displacement of movement of the same;
- comparator means for producing a deviation signal in correspondence with the deviation of the current position signal supplied from the position encoder means from the reference position signal;
- a power amplifier for feeding an electric current to each of plural windings in the positioning device in accordance with the deviation;
- first servo loop means including the positioning device, position encoder means, comparator means, and power amplifier so as to constitute a closed loop servo system;
- tracking error detector means for producing a tracking error signal upon detecting the position error occurring between the data transducer and the data track;
- compensating position calculator means for producing a compensating position signal, which will be added to the reference position signal, in accordance with the tracking error signal;
- second servo loop means including the tracking error detector means and compensating position calculator means so as to constitute a closed loop servo system; and
- position profile generator means for producing a position profile signal, which will also be added to the reference position signal, in accordance with the information of subsequent track selection so that the data transducer can be moved between the data tracks by position trajectory control.

40. A system according to claim 39, wherein the position encoder means is arranged for resolution of at least more than 1/10-pitch interpolation in a data track while its current position signal output represents the displacement of current movement of the positioning device throughout the linear movable range in the absolute position measure with a specified datum point defined as a reference point.

41. A system according to claim 39, wherein the position encoder means comprises position signal generator means for producing plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal.

42. A system according to claim 39, wherein the compensating position calculator means includes low frequency compensating means for increasing the gain of low frequency elements contained in the tracking error signal.

43. A system according to claim 39, wherein the compensating position calculator means includes a recursive digital filter for having a particular high gain in the harmonic elements which are of an integral multiple of basic frequency element in a rotating period of a disk medium and contained in the tracking error signal.

44. A system according to claim 39, wherein the compensating position calculator means is arranged to either stop calculation or produce no compensating position signal output during the movement of the data transducer between the data tracks in accordance with the information of subsequent track selection.

45. A system according to claim 39, wherein the position profile generator means is arranged to produce a stepping position profile signal when the displacement of the data transducer between the data tracks effected in accordance with the information of subsequent track selection, is less than a predetermined number of data tracks.

46. A system according to claim 39, wherein the position profile generator means is arranged to produce a position profile signal involving constant deceleration either after constant acceleration or after constant running in the movement of the data transducer between the data tracks in accordance with the information of subsequent tracks selection.

47. A system according to claim 39, wherein the combination of the comparator means, electric angle calculator means, compensating position calculator means, and position profile generator means is incorporated with memory means for storing program data of process information, sequencer means for controlling the proceedings of process, and arithmetic logical unit means for executing the process of calculation in accordance with the program data.

48. A data transducer position control system for data disk storage drive system having a data transducer adapted to write and/or read information data to and-/or from a plurality of data tracks provided on the surface of a data disk, comprising:

a positioning device for moving the data transducer on the disk surface;

position encoder means provided with position signal generator means for producting plural phase position signals of approximately sine wave form, which are different from each other in phase, upon detecting the displacement of movement of the positioning device, carrier signal generator means for producing carrier signals modulated by the plural phase position signals, and demodulator means for demodulating the phase information from the modulated carrier signal, said position encoder means having the resolution of at least more than 1/10-pitch interpolation in a data track while its current position signal output represents the displacement of current movement of the positioning device throughout the linear movable range in the absolute position measure with a specified datum point defined as a reference point;

comparator means for producing a deviation signal in correspondence with the deviation of the current position signal supplied from the position encoder means from the reference position signal;

a power amplifier for feeding an electric current to each of plural windings in the positioning device in accordance with the deviation;

first servo loop means including the positioning device, position encoder means, comparator means, and power amplifier so as to constitute a closed loop servo system;

tracking error detector means for producing a tracking error signal upon detecting the position error occurring between the data transducer and the data track;

compensating position calculator means for producing a compensating position signal, which will be added to the reference position signal, in accordance with the tracking error signal;

second servo loop means including the tracking error detector means and compensating position calculator means so as to constitute a closed loop servo system; and position profile generator means for producing a position profile signal, which will also be added to the reference position signal, in accordance with the information of subsequent track selection so that the data transducer can be moved between the data tracks by position trajectory control.

49. A system according to claim 48, wherein the position profile generator means is arranged to produce a stepping position profile signal when the displacement of the data transducer between the data tracks effected in accordance with the information of subsequent track selection, is less than a predetermined number of data tracks.

50. A system according to claim 48, wherein the position profile generator means is arranged to produce a position profile signal involving constant deceleration either after constant acceleration or after constant running in the movement of the data transducer between the data tracks in accordance with the information of subsequent tracks selection.

51. A data transducer position control system for data disk storage drive system having a data transducer adapted to write and/or read information data to and-/or from a plurality of data tracks provided on the surface of a data disk, comprising:

a positioning device for moving the data transducer on the disk surface;

position encoder means for producing a current position signal representing the current position of the positioning device upon detecting the displacement of movement of the same;

comparator means for producing a deviation signal in correspondence with the deviation of the current position signal supplied from the position encoder means from the reference position signal;

a power amplifier for feeding an electric current to each of plural windings in the positioning device in accordance with the deviation;

first servo loop means including the positioning device, position encoder means, comparator means, and power amplifier so as to constitute a closed loop servo system;

tracking error detector means for producing a tracking error signal upon detecting the position error occurring between the data transducer and the data track;

compensating position calculator means for producing a compensating position signal, which will be added to the reference position signal, in accordance with the tracking error signal;

second servo loop means including the tracking error detector means and compensating position calculator means so as to constitute a closed loop servo system; and off-track discriminator means including a simulator means for producing a simulation signal of the current position signal as simulating in real time the whole or a part of operation of the first servo loop means and an off-track detector means for monitoring the off-tracking of the data transducer from the selected data track with using the current position signal and simulation signal.

52. A system according to claim 51, wherein the simulator means has the input/output frequency characteristic of passing low frequency and cutting off high frequency.

53. A system according to claim 51, wherein the off-track discriminator means further includes memory means for storing the program data about a series of procedures of process from the simulator means to an offset monitor means and arithmetic logical unit means for executing the calculation in accordance with the program data.

* * * * *